United States Patent
Damak et al.

(10) Patent No.: US 10,882,054 B2
(45) Date of Patent: Jan. 5, 2021

(54) SYSTEMS AND METHODS FOR COLLECTING A SPECIES

(71) Applicant: Massachusetts Institute of Technology, Cambridge, MA (US)

(72) Inventors: Maher Damak, Cambridge, MA (US); Seyed Reza Mahmoudi, Waltham, MA (US); Kripa K. Varanasi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 272 days.

(21) Appl. No.: 15/763,229

(22) PCT Filed: Sep. 28, 2016

(86) PCT No.: PCT/US2016/054230
§ 371 (c)(1),
(2) Date: Mar. 26, 2018

(87) PCT Pub. No.: WO2017/058949
PCT Pub. Date: Apr. 6, 2017

(65) Prior Publication Data
US 2018/0272358 A1    Sep. 27, 2018

Related U.S. Application Data

(60) Provisional application No. 62/233,499, filed on Sep. 28, 2015.

(51) Int. Cl.
*B03C 3/47* (2006.01)
*B03C 3/09* (2006.01)
(Continued)

(52) U.S. Cl.
CPC .............. *B03C 3/47* (2013.01); *B03C 3/013* (2013.01); *B03C 3/08* (2013.01); *B03C 3/09* (2013.01);
(Continued)

(58) Field of Classification Search
CPC combination set(s) only.
See application file for complete search history.

(56) References Cited

U.S. PATENT DOCUMENTS 2,962,265 A    11/1960   Luik, Jr.
3,889,532 A     6/1975   Pilie et al.
(Continued)

FOREIGN PATENT DOCUMENTS

CN   102186594 A   9/2011
CN   102648055 A   8/2012
(Continued)

OTHER PUBLICATIONS

Extended European Search Report dated Apr. 5, 2019 for European Application No. EP 16852513.7.
(Continued)

*Primary Examiner* — Christopher P Jones
*Assistant Examiner* — Sonji Turner
(74) *Attorney, Agent, or Firm* — Wolf, Greenfield & Sacks, P.C.

(57) ABSTRACT

Systems and methods related to the collection of a species from a gas stream are generally provided. The systems and methods described herein may allow for collection of a species such as a fluid (e.g., water) with a relatively high collection efficiency. Such systems and methods may be useful in various applications including, for example, fog collection. In some embodiments, the systems and methods enhance water collection from airborne fog to produce usable water. Advantageously, the methods described herein
(Continued)

may, in some cases, incorporate ions into the gas stream such that the species present in the gas stream follows electric field lines and/or are attracted to a grounded (or charged) collector. Advantageously, the systems and methods described herein may suppress the adverse effects of natural conditions such as the velocity and direction of the wind.

33 Claims, 22 Drawing Sheets

(51) Int. Cl.
| | |
|---|---|
| B03C 3/12 | (2006.01) |
| B03C 3/013 | (2006.01) |
| C02F 1/78 | (2006.01) |
| E03B 3/28 | (2006.01) |
| B03C 3/41 | (2006.01) |
| B03C 3/08 | (2006.01) |
| C02F 1/46 | (2006.01) |

(52) U.S. Cl.
CPC ............ B03C 3/12 (2013.01); B03C 3/41 (2013.01); E03B 3/28 (2013.01); C02F 1/4608 (2013.01); C02F 1/78 (2013.01); C02F 2201/782 (2013.01); C02F 2303/04 (2013.01); Y02A 20/00 (2018.01)

(56) References Cited

U.S. PATENT DOCUMENTS

| | | | |
|---|---|---|---|
| 4,670,026 A | 6/1987 | Hoenig | |
| 4,734,105 A * | 3/1988 | Eliasson | B03C 3/019 95/62 |
| 4,876,852 A | 10/1989 | Abthoff et al. | |
| 5,056,593 A | 10/1991 | Hull | |
| 5,124,012 A | 6/1992 | Berleyev | |
| 5,275,643 A | 1/1994 | Usui | |
| 5,695,549 A * | 12/1997 | Feldman | B03C 3/0175 95/80 |
| 6,221,136 B1 | 4/2001 | Liu et al. | |
| 6,302,944 B1 * | 10/2001 | Hoenig | B01D 53/007 96/16 |
| 6,397,619 B1 | 6/2002 | Cheng et al. | |
| 7,000,410 B2 * | 2/2006 | Hutchinson | B01D 5/0039 62/93 |
| 7,025,806 B2 * | 4/2006 | Coppom | B03C 3/09 264/258 |
| 7,513,933 B2 * | 4/2009 | Coppom | B03C 3/09 95/70 |
| 8,961,659 B2 * | 2/2015 | McKinney | B01D 46/0032 422/121 |
| 9,132,383 B2 * | 9/2015 | Ursem | B03C 3/41 |
| 2002/0046569 A1 | 4/2002 | Faqih | |
| 2005/0097901 A1 | 5/2005 | Hutchinson | |
| 2005/0257515 A1 * | 11/2005 | Song | B05B 5/008 60/202 |
| 2005/0269254 A1 | 12/2005 | Roitman | |
| 2006/0185511 A1 * | 8/2006 | Tepper | B03C 3/16 95/71 |
| 2007/0234905 A1 | 10/2007 | Bromberg | |
| 2007/0295021 A1 * | 12/2007 | Tyls | E03B 3/28 62/285 |
| 2008/0295687 A1 | 12/2008 | Galbrun et al. | |
| 2010/0212348 A1 | 8/2010 | Oh | |
| 2010/0326274 A1 | 12/2010 | Ursem et al. | |
| 2013/0199221 A1 | 8/2013 | Tudor | |

FOREIGN PATENT DOCUMENTS

| | | |
|---|---|---|
| CN | 105492121 A | 4/2016 |
| DE | 19841973 C2 | 8/2002 |
| RU | 2215693 C2 | 11/2003 |

OTHER PUBLICATIONS

Uchiyama et al., Development of an Electrostatic Fogliquefier and Its Field Experiments. Japanese Journal of Applied Physics. Nov. 1989;28(11):2319-20.
Chinese Office Action dated Apr. 12, 2019 for CN Application No. 201680066158.6.
Anagnostopoulos et al., Corona discharge simulation in wire-duct electrostatic precipitator. J. Electrostat. Feb. 2002;54(2):129-47.
Aussillous et al., Liquid marbles. Nature. Jun. 21, 2001;411(6840):924-7.
Bird et al., Critical angle for electrically driven coalescence of two conical droplets. Phys Rev Lett. Oct. 16, 2009;103(16):164502(1-4). Epub Oct. 16, 2009.
Bonhomme et al., Soft nanofluidic transport in a soap film. Phys Rev Lett. Feb. 1, 2013;110(5):054502(1-5). Epub Feb. 1, 2013.
Castle et al., Groundwater depletion during drought threatens future water security of the Colorado River Basin. Geophys Res Lett. Jul. 2014;41:5904- 11. https://doi.org/10.1002/2014GL061055.
Foresti et al., Acoustophoretic contactless transport and handling of matter in air. Proc Natl Acad Sci U S A. Jul. 30, 2013;110(31):12549-54. doi: 10.1073/pnas.1301860110. Epub Jul. 15, 2013.
Hamilton et al., Fog basking by the Namib Desert beetle, *Onymacris unguicularis*. Nature. Jul. 22, 1976;262:284-5.
Hering et al., Field intercomparison of five types of fog water collectors. Environ Sci Technol. Jul. 1987;21(7):654-63. doi: 10.1021/es00161a006.
Jaworek et al., 3D model for trajectories of airborne particles near a charged spherical collector. Third Intl Conf on Multiphase Flow. ICMFi98. Lyon, France, Jun. 8-12, 1998. pp. 1-8.
Ju et al., Bioinspired conical copper wire with gradient wettability for continuous and efficient fog collection. Adv Mater. Nov. 6, 2013;25(41):5937-42. doi: 10.1002/adma.201301876. Epub Aug. 19, 2013.
Ju et al., A multi-structural and multi-functional integrated fog collection system in cactus. Nat Commun. 2012;3:1247(1-6). Epub Dec. 4, 2012. doi: 10.1038/ncomms2253.
Khalil et al., Active surfaces: Ferrofluid-impregnated surfaces for active manipulation of droplets. Appl Phys Lett. 2014;105:041604(1-4). Epub Aug. 1, 2014.
Klemm et al., Fog as a fresh-water resource: Overview and perspectives. Ambio. May 2012;41(3):221-34. doi: 10.1007/s13280-012-0247-8. Epub Feb. 12, 2012.
Kraemer et al., Collection of aerosol particles in presence of electrostatic fields. Ind Eng Chem.1955;47(12):2426-34.
McDonald et al., A mathematical model for calculating electrical conditions in wire-duct electrostatic precipitation devices. J Appl Phys. Jun. 1977;48(6):2231-43.
Means, Fog precipitated by trees. Science. Oct. 28, 1927;66(1713):402-3.
Mugele et al., Electrowetting: From basics to applications. J Phys Condens Matter. 2005;17:R705-74.
Nikas et al., Numerical simulation of the flow and the collection mechanisms inside a laboratory scale electrostatic precipitator. J. Electrostat. 2005;63:423-43. Epub Jan. 29, 2005.
Park et al., Optimal design of permeable fiber network structures for fog harvesting. Langmuir. Oct. 29, 2013;29(43):13269-77. doi: 10.1021/la402409f. Epub Jul. 29, 2013.
Parker et al., Water capture by a desert beetle. Nature. Nov. 2001;414:33-4.
Pilie et al., Warm fog suppression in large-scale laboratory experiments. Science. Sep. 1967;157(3794):1319-20.
Piroird et al., Magnetic control of Leidenfrost drops. Phys Rev E Stat Nonlin Soft Matter Phys. May 2012;85(5 Pt 2):056311(1-4). Epub May 23, 2012.
Prakash et al., Microfluidic bubble logic. Science. Feb. 9, 2007;315(5813):832-5.
Rivera, Aerodynamic collection efficiency of fog water collectors. Atmospheric Res. Nov. 2011;102(3);335-42.
Schemenauer et al., The collection efficiency of a massive fog collector. Atmospheric Res. 1989;24:53-69.

(56) References Cited

OTHER PUBLICATIONS

Schemenauer et al., A proposed standard fog collector for use in high-elevation regions. J Appl Meteorol. Nov. 1994;33:1313-22.
Skodras et al., Particulate removal via electrostatic precipitators—CFD simulation. Fuel Process Technol. Jul. 2006;87(7):623-31.
Uchiyama et al., Field experiments of an electrostatic fog-liquefier. J Electrostat. Jul. 1995;35(1):133-43.
Velev et al., On-chip manipulation of free droplets. Nature. Dec. 4, 2003;426(6966):515-6.
Wang et al., Particle deposition on spheres by inertial and electrostatic forces. Aerosol Sci Technol. Jan. 1986;5(4):391-408.
Zheng et al., Directional water collection on wetted spider silk. Nature. Feb. 4, 2010;463(7281):640-3. doi: 10.1038/nature08729.
International Search Report and Written Opinion dated Dec. 13, 2016 for Application No. PCT/US2016/054230.
International Preliminary Report on Patentability dated Apr. 12, 2018 for Application No. PCT/US2016/054230.
[No Author Listed], Electrostatic Precipitators. Dartmouth Engineering, Mar. 14, 2014. Retrieved on the Internet Nov. 15, 2016. https://web.archive.org/web/20140327120900/http://engineering.dartmouth.edu/~d30345d/courses/engs37/ESPs.pdf. 10 pages.

* cited by examiner

SYSTEMS AND METHODS FOR COLLECTING A SPECIES

RELATED APPLICATIONS

This application is a national stage application under 35 U.S.C. § 371 of International Patent Application Serial No. PCT/US2016/054230, filed on Sep. 28, 2016, entitled "SYSTEMS AND METHODS FOR COLLECTING A SPECIES", which claims priority under 35 U.S.C. § 119(e) to U.S. Provisional Patent Application Ser. No. 62/233,499, filed Sep. 28, 2015 and entitled "Enhanced Fog Collection with Corona Discharge," each of which are incorporated herein by reference in their entirety for all purposes.

FIELD

The present invention relates generally to systems and methods for collection of a species from a gas stream such as the collection of a liquid from a gas stream under the influence of an electric field.

BACKGROUND

Although access to clean water is considered as a human right, there are still over 1.1 billion people who lack access to safe drinking water worldwide according to the World Water Council, and this number is expected to increase, as water resources are more and more polluted and scarce due to global warming. Water scarcity can cause serious economical and social issues in the regions where it occurs. One promising solution to provide clean water to such regions is fog harvesting. Fog is a cloud that touches the ground, composed of tiny droplets of diameters ranging from 1 to 40 μm with a typical diameter of 10 μm. Fog harvesting is particularly appropriate in remote, drought-prone areas where rainwater harvesting is impossible and where water transportation is prohibitively expensive. It can also be useful in regions where water is currently available, but where non-renewable groundwater is heavily used. Collecting water from fog can then mitigate the depletion of groundwater reserves. If dense fog occurs on a regular basis in such areas, then fog collection may be an economically viable solution to meet the needs in water of local populations. Areas prone to large fog formation are usually close to oceans where fog clouds form over the water and are then transported by the wind, but there are also some inland areas where climatic conditions make it possible for a dense fog to form.

Fog collectors have been successfully implemented in 17 countries, generally to provide water to poor communities, even if it has also been implemented in some developed countries such as Spain. The technology used is simple and sustainable and the water provided could be used in various applications: In addition to drinking water for humans and animals, the collected water may be used for cleaning, crop irrigation and afforestation.

Although fog-harvesting systems have been designed for centuries, and even with the improvements of the last decades, their efficiency remains dramatically low, generally around 2% for the systems used in practice. Accordingly, improved compositions and methods are needed.

SUMMARY

Methods and articles for the collection of species from a gas stream as well as related components and methods associated therewith are provided. The subject matter of the present invention involves, in some cases, interrelated products, alternative solutions to a particular problem, and/or a plurality of different uses of one or more systems and/or articles.

In one aspect, methods for collection a species present in a gas stream are provided. In some embodiments, the method comprises establishing a plurality of charged species in the gas stream, electrically biased against a collector and collecting the charged species at the collector at a collection efficiency of greater than or equal to 10%.

In some embodiments, the method comprises arranging at least a first and second electrode so as to apply an electric field to at least a portion of the gas stream thereby urging the species toward the second electrode and isolating at least a portion of the species from the gas stream, wherein a minimum distance between the first electrode and the second electrode is between 2 cm and 50 cm.

In some embodiments, the method comprises arranging, within the gas stream, a first electrode and a second electrode proximate the first electrode, applying a potential to the first electrode such that at least a portion of the fluid present in the gas stream deposits on the second electrode and collecting the fluid. In some embodiments, a minimum distance between the first electrode and the second electrode is between 2 cm and 50 cm.

In some embodiments, the method comprises arranging, within the gas stream, a first electrode and a second electrode proximate the first electrode, applying a potential to the first electrode such that at least a portion the fluid present in the gas stream deposits on the second electrode and collecting the fluid at an energy efficiency of greater than or equal to 1 liter per kWh of energy applied in creating the field.

In another aspect, systems are provided. In some embodiments, the system comprises a first electrode and a second electrode configured to be positioned proximate the first electrode, a power source in electrical communication with at least the first electrode, and a collector. In some embodiments, the system is configured to collect a species present within a gas stream with an energy efficiency of greater than or equal to 1 liter per kWh of energy applied in creating the field. In certain embodiments, the system is configured to collect a species present within a gas stream with a collection efficiency of greater than or equal to 10%.

In certain embodiments, the species comprises water. In certain embodiments, the second electrode comprises a mesh. In certain embodiments, the second electrode comprises parallel wires. In certain embodiments, the first electrode comprises needles. In certain embodiments, an average radius of curvature of the needles is greater than or equal to 10 microns.

In certain embodiments, the second electrode is positioned downstream of the first electrode. In certain embodiments, the second electrode is positioned upstream of the first electrode. In certain embodiments, the first electrode is held at a negative potential. In certain embodiments, the first electrode is held at a positive potential. In certain embodiments, the second electrode is grounded. In certain embodiments, the second electrode is held at a negative potential. In certain embodiments, the second electrode is held at a positive potential. In certain embodiments, water is collected on a surface of the second electrode facing the first electrode. In certain embodiments, water is collected on a surface of the second electrode not facing the first electrode.

In certain embodiments, a difference in potential between the first electrode and the second electrode is greater than or equal to 2 kV and less than or equal to 100 kV. In certain embodiments, applying the potential to the first electrode comprises ionizing at least a portion of the air stream. In certain embodiments, the method comprises exposing the air steam to ozone. In certain embodiments, the method comprises applying the potential to the first electrode such that ozone is generated. In certain embodiments, a corona discharge is generated by the first electrode. In certain embodiments, the corona discharge purifies at least a portion of the fluid collected.

In certain embodiments, the method or system comprises a third electrode. In certain embodiments, the third electrode is positioned downstream of the second electrode. In certain embodiments, the third electrode is capable of charging the species.

In certain embodiments, the electrode or component used to charge species does not contribute to the electric field used to collect the species. In certain embodiments, the electrode or component used to charge species does contribute to the electric field used to collect the species. In certain embodiments, the combination of a perforated plate and a grounded electrode is used to charge the species.

In certain embodiments, a Taylor cone of an ionic liquid is used to generate space charge. In certain embodiments, electrospraying a volatile liquid is used to generate space charge.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

Figure 15A:
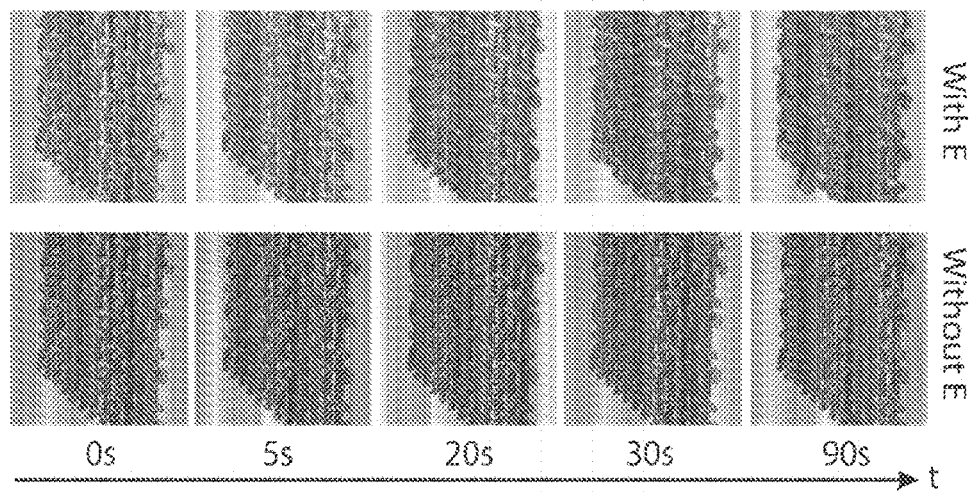
Figure 15B:
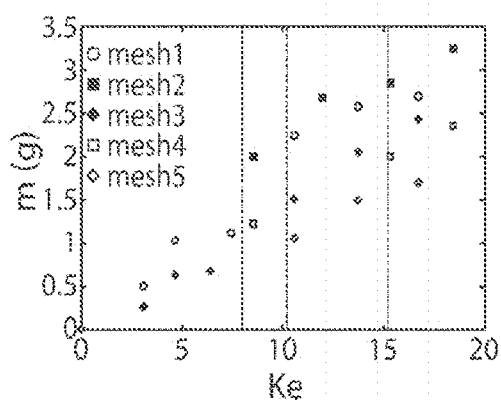
Figure 15C:
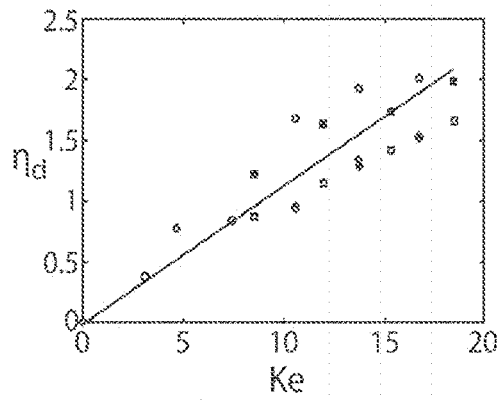
Figure 16A:
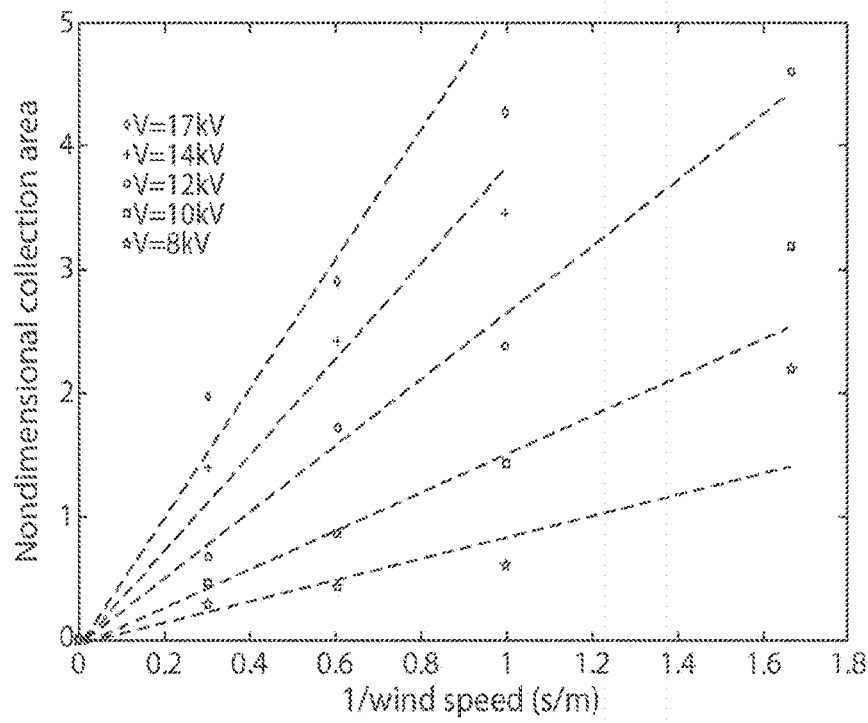
Figure 16B:
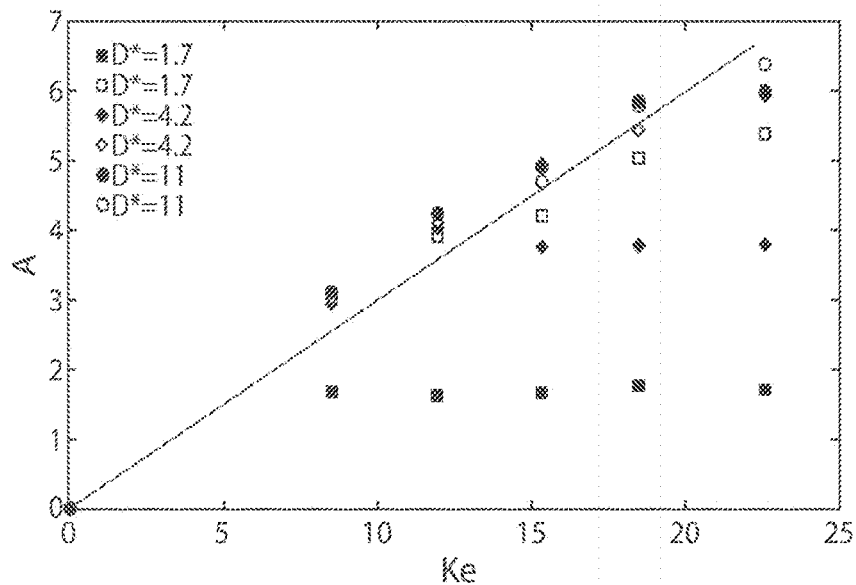

as a function of Ke for different wire distances;

FIG. 15A shows, in accordance with certain embodiments, photographs of meshes at different time intervals after fog exposure;

FIG. 15B shows a plot of the mass of the collected water as a function of Ke for different meshes, according to some embodiments;

FIG. 15C shows a plot of the deposition efficiency as a function of Ke for different meshes, according to certain embodiments;

FIG. 16A shows a plot of the nondimensional collection area as a function of the inverse of wind speed for five different voltages; and FIG. 16B shows a plot of the nondimensional collection area for two wires as a function of Ke for three different wire distances.

DETAILED DESCRIPTION

Systems and methods related to the collection of a species from a gas stream are generally provided. The systems and methods described herein may allow for collection of a species such as a fluid (e.g., water) with a relatively high collection efficiency. Such systems and methods may be useful in various applications including, for example, fog collection. In some embodiments, the systems and methods enhance water collection from airborne fog to produce usable water. Traditional fog collection systems may be limited by the distortion of hydrodynamic streamlines upstream of the collector, preventing some of the species present in the gas stream from reaching the collector, reducing the collection rate and/or collection efficiency of the collection system. Advantageously, the methods described herein may, in some cases, incorporate ions into the gas stream such that the species present in the gas stream follows electric field lines and/or are attracted to a grounded (or charged) collector. For example, a corona discharge may be used to charge the species such that the electric field overcomes the forces generated by hydrodynamic streamlines, resulting in an increased collection efficiency as compared to traditional collection systems, while, in some cases, using relatively low power consumption. In some embodiments, the ionic discharge is established between an emitter (e.g., an electrode) and a grounded collector (e.g., a mesh). Without wishing to be bound by theory, the additional electric body force generally changes the trajectory of the charged species such that it is directed towards the mesh and the streamline distortion becomes less important. Advantageously, the systems and methods described herein may suppress the adverse effects of natural conditions such as the velocity and direction of the wind. In some embodiments, two or more surfaces (e.g., sides) of the collector may be used to capture the species from the gas stream. In certain embodiments, the systems and methods described herein may disinfect the collected species. For example, in some cases, ozone is generated during generation of the electric field such that the ozone disinfects the collection species during collection. The system may be scaled by, for example, increasing the number of emitters and/or collectors.

In an exemplary embodiment, a plurality of charged species may be established in a gas stream, the plurality of charged species being electrically biased against a collector, such that the charged species are collected at the collector. In another exemplary embodiment, at least one electrode may be arranged to apply an electric field to at least a portion of a gas stream, such that a plurality of species are urged towards a collector (e.g., a second electrode) and/or isolated from the stream.

Figure 1A:
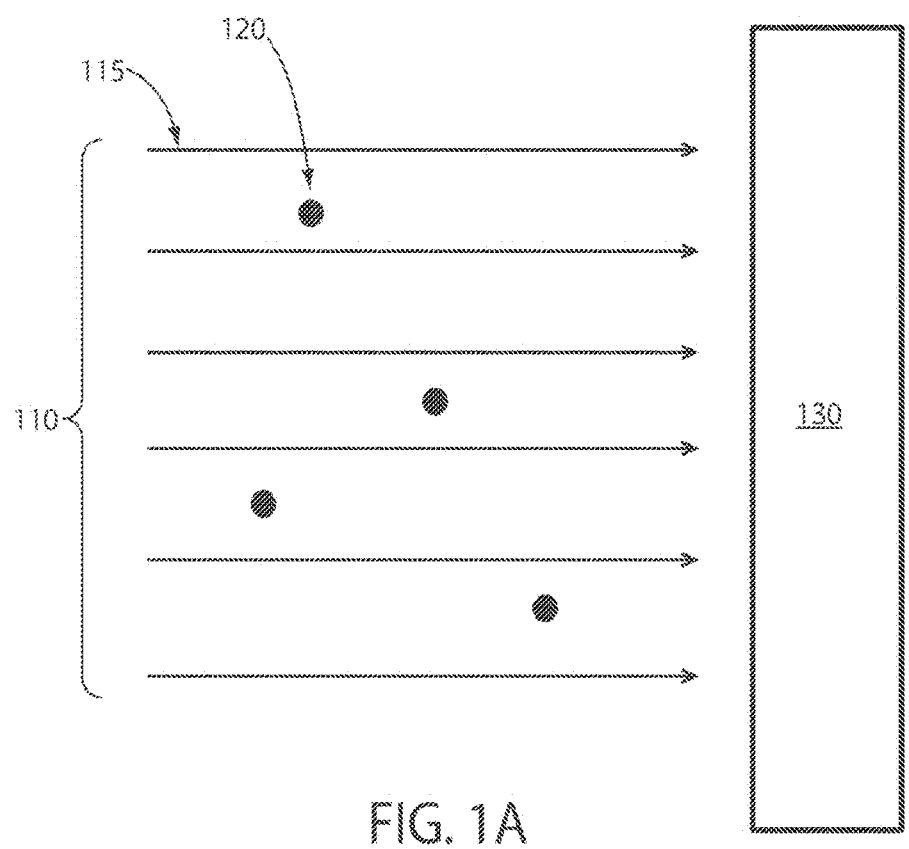
FIG. 1A shows, in accordance with some embodiments, a schematic illustration of a method of applying an electric field to a gas stream comprising a species.

As illustrated in FIG. 1A, in some embodiments, a gas stream 110 may comprise a plurality of species (e.g., fluid droplets) 120. In some embodiments, the plurality of species may be charged. In some such embodiments, plurality of species 120 may be urged towards a collector 130. For example, in some cases, the plurality of species may be charged such that they are electrically biased against the collector. In some embodiments, the plurality of species may be collected at collector 130.

In some embodiments, the plurality of species may not be charged and flow according to hydrodynamic streamlines of the gas stream (e.g., streamlines 115 in FIG. 1A). In certain embodiments, however, the plurality of species may be charged such that the plurality of species do not flow according to the hydrodynamic streamlines of the gas stream. For example, in some embodiments, an electric field may be applied to at least a portion of the gas stream. In some such embodiments, the plurality of species may be urged towards the collector (e.g., an electrode) and/or isolated from the gas stream.

In some embodiments, the plurality of species may be collected on the collector with a collection efficiency of greater than or equal to 10%. Those skilled in the art, based upon the teachings of the specification and descriptions of the various techniques and arrangements described herein to affect efficiency, would be able to, without undue experimentation, build a system that has a collection efficiency of greater than or equal to 10%, using any of the arrangements (e.g., meshes, electrodes, droplet generations, etc.) described herein. That is to say, a significant aspect of the invention is the development of a series of parameters that lead to a collection efficiency of greater than or equal to 10%, and the development of various factors that affect efficiency such that one or more can be used in combination with one or more of the other techniques described herein for generating charged species (e.g., charged droplets) and collecting the species, to achieve the collection efficiencies described herein.

The collection efficiency of the system, as used herein, is defined as the ratio of the rate at which the species is collected by the collector to the rate at which the species flows through the collector, expressed as a percentage. In some embodiments, the efficiency may be greater than or equal to 5%, greater than or equal to 10%, greater than or equal to 15%, greater than or equal to 25%, greater than or equal to 50%, greater than or equal to 75%, greater than or equal to 90%, or greater than or equal to 100%. In certain embodiments, the efficiency may be less than or equal to 150%, less than or equal to 90%, less than or equal to 75%, less than or equal to 15%, or less than or equal to 10%. Combinations of the above-referenced ranges are also possible (e.g., greater than or equal to 10% and less than or equal to 150%). Other ranges are also possible.

Certain methods for collection of a species may be able to collect a relatively large amount of the species while consuming a relatively low amount of power. Such systems may be considered to be energy efficient. As used herein, the energy efficiency refers to the ratio of the species collected in liters to the amount of energy used to collect the species. In some embodiments, the energy efficiency may be less than or equal to 20000 L/kWh, less than or equal to 175500 L/kWh, less than or equal to 15000 L/kWh, less than or equal to 12500 L/kWh, less than or equal to 10000 L/kWh, less than or equal to 7500 L/kWh, 5000 L/kWh, less than or equal to 4750 L/kWh, less than or equal to 4500 L/kWh, less than or equal to 4250 L/kWh, less than or equal to 4000 L/kWh, less than or equal to 3750 L/kWh, less than or equal to 3500 L/kWh, less than or equal to 3250 L/kWh, less than or equal to 3000 L/kWh, less than or equal to 2750 L/kWh, less than or equal to 2500 L/kWh, less than or equal to 2250 L/kWh, less than or equal to 2000 L/kWh, less than or equal to 1750 L/kWh, less than or equal to 1500 L/kWh, less than or equal to 1250 L/kWh, less than or equal to 1000 L/kWh, less than or equal to 750 L/kWh, less than or equal to 500 L/kWh, less than or equal to 250 L/kWh, less than or equal to 100 L/kWh, less than or equal to 75 L/kWh, less than or equal to 50 L/kWh, or less than or equal to 20 L/kWh. In certain embodiments, the energy efficiency may be greater than or equal to 1 L/kWh, greater than or equal to 20 L/kWh, greater than or equal to 50 L/kWh, greater than or equal to 75 L/kWh, greater than or equal to 100 L/kWh, greater than or equal to 250 L/kWh, greater than or equal to 500 L/kWh, greater than or equal to 750 L/kWh, greater than or equal to 1000 L/kWh, greater than or equal to 1250 L/kWh, greater than or equal to 1500 L/kWh, greater than or equal to 1750 L/kWh, greater than or equal to 2000 L/kWh, greater than or equal to 2250 L/kWh, greater than or equal to 2500 L/kWh, greater than or equal to 2750 L/kWh, greater than or equal to 3000 L/kWh, greater than or equal to 3250 L/kWh, greater than or equal to 3500 L/kWh, greater than or equal to 3750 L/kWh, greater than or equal to 4000 L/kWh, greater than or equal to 4250 L/kWh, greater than or equal to 4500 L/kWh, greater than or equal to 4750 L/kWh, greater than or equal to 5000 L/kWh, greater than or equal to 7500 L/kWh, greater than or equal to 10000 L/kWh, greater than or equal to 12500 L/kWh, greater than or equal to 15000 L/kWh, or greater than or equal to 17500 L/kWh. Combinations of the above-referenced ranges are also possible (e.g., less than or equal to 5000 L/kWh and greater than or equal to 1 L/kWh, less than or equal to 5000 L/kWh and greater than or equal to 20 L/kWh, or less than or equal to 20000 L/kWh and greater than or equal to 1 L/kWh). Other ranges are also possible. In some embodiments, the species may be collected at a relatively high rate.

According to some embodiments, collection may occur at a rate of greater than or equal to 1 L/(day·m$^2$), greater than or equal to 2.5 L/(day·m$^2$), greater than or equal to 5 L/(day·m$^2$), greater than or equal to 10 L/(day·m$^2$), greater than or equal to 25 L/(day·m$^2$), greater than or equal to 50 L/(day·m$^2$), greater than or equal to 100 L/(day·m$^2$), greater than or equal to 250 L/(day·m$^2$), or greater than or equal to 500 L/(day·m$^2$). According to some embodiments, collection may occur at a rate of less than or equal to 1000 L/(day·m$^2$), less than or equal to 500 L/(day·m$^2$), less than or equal to 250 L/(day·m$^2$), less than or equal to 100 L/(day·m$^2$), less than or equal to 50 L/(day·m$^2$), less than or equal to 25 L/(day·m$^2$), less than or equal to 10 L/(day·m$^2$), less than or equal to 5 L/(day·m$^2$), or less than or equal to 2.5 L/(day·m$^2$). Combinations of the above-referenced ranges are also possible (e.g., greater than or equal to 1 L/(day·m$^2$) and less than or equal to 1000 L/(day·m$^2$)). Other ranges are also possible.

The rate of collection of the species may be measured by any suitable technique known to one of skill in the art. One technique for measuring the rate of collection of the species is to expose the collection apparatus to a uniform gas stream comprising the species and to weigh and record the mass of the collection apparatus as it is collecting the species. If the density of the species is known (or experimentally determined), the collection rate can be calculated by dividing the rate at which mass accumulates on the collection apparatus by the density of the species.

As described above, a significant aspect of the invention is the development of various factors that affect efficiency such that one or more can be used in combination with one or more of the other techniques described herein for generating charged droplets and collecting them to achieve this efficiency. Exemplary methods and collection systems for generating and collecting charged droplets are described in further detail below.

Figure 1B:
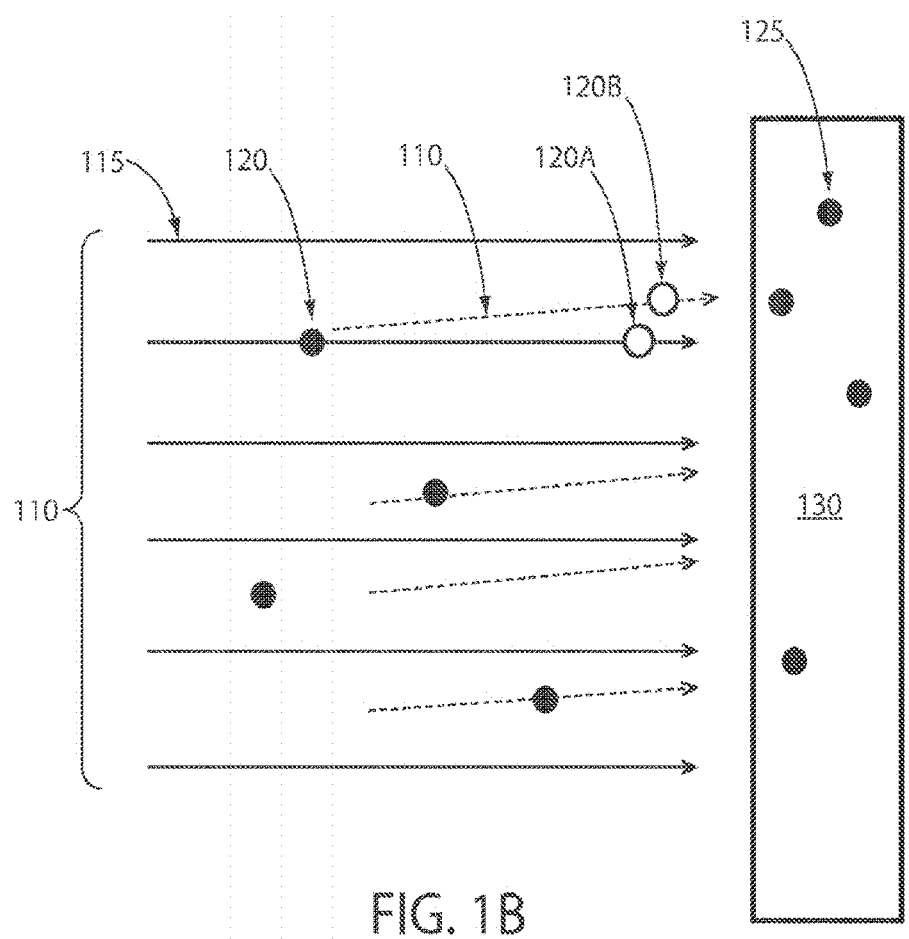
FIG. 1B shows, according to certain embodiments, a schematic illustration of the trajectories of charged species under the influence of an applied electric field.

In some embodiments, the method may comprise removing the species from the gas stream. FIG. 1B depicts one method for removing the species from the gas stream. For example, as illustrated in FIG. 1B, in some embodiments, gas stream 110 comprises plurality of species 120. Electric field 100 may be applied to at least a portion of gas stream 110 such that the plurality of species 120 are urged towards collector 130 (e.g., an electrode). In some embodiments, in the absence of the electric field, plurality of species 120 may flow following streamlines 115 (e.g., to position 120A). In certain embodiments, in the presence of the electric field, flow of plurality of species 120 may be affected by electric field 100 (e.g., to position 120B), as compared to the flow in the absence of the electric field. In some embodiments, electric field 100 urges plurality of species 120 towards and/or collect on collector 130 (e.g., collected species 125 on collector 130), whereas, in the absence of electric field 100, at least a portion of plurality of species 120 would not be urged towards and/or collect on collector 130. In certain embodiments, the plurality of species may be charged. In some cases, ions may be added to the gas stream (e.g., via corona discharge) such that the plurality of species are urged towards the collector. In some cases, the plurality of species present in the gas stream are moved (e.g., flowed) under the influence of forces generated by both the applied electric field and the gas stream. Those of ordinary skill in the art would understand, based upon the teachings of this specification, that while FIG. 1B depicts a uniform electric field, other electric fields could also be used to direct the flow of the species (including, but not limited to, electric fields where the magnitude and/or the direction of the field vary spatially and/or temporally).

In FIG. 1B, species 120 has been urged towards collector 130 (e.g., an electrode) by the electric field such that it has contacted the collector. In a gas stream comprising multiple particles of the species to be at least partially isolated, at least a portion of the particles may be urged by the electric field to contact the collector. The collector may comprise any suitable configuration. In some embodiments, the collector is a porous substrate (e.g., a plate comprising a plurality of perforations/openings, a mesh, a non-woven fiber web). In some embodiments, the collector comprises a mesh (e.g., a conductive mesh). In certain embodiments, the collector comprises a plurality of wires (e.g., a plurality of substantially parallel wires). In some cases, the collector may comprise a plate comprising a plurality of openings that pass through its thickness. Other collectors are also possible.

Figure 2A:
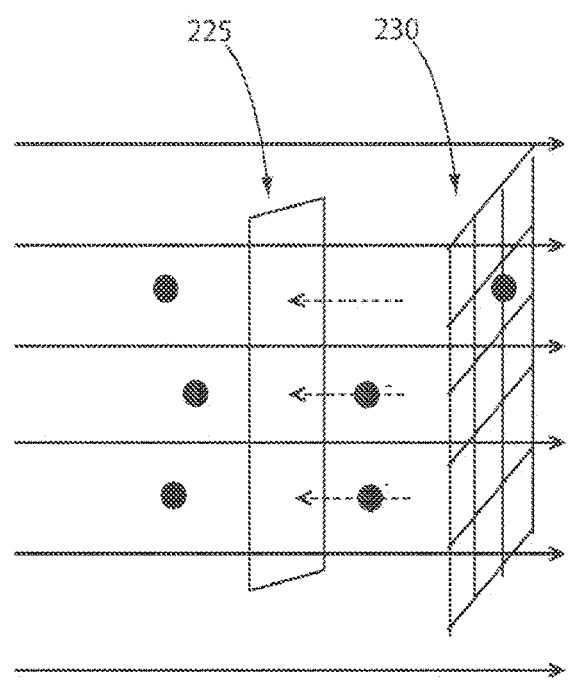
FIG. 2A shows an exemplary schematic illustration of a method where species are charged by a charge generator positioned upstream of a collector.
Figure 2B:
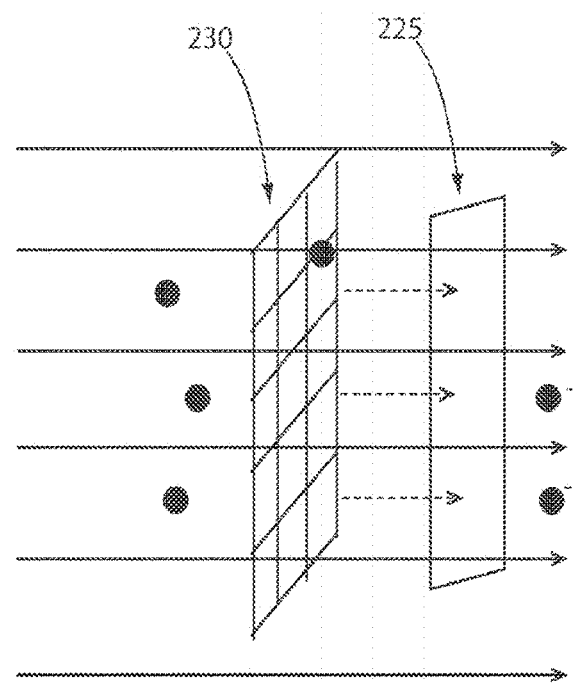
FIG. 2B shows, according to certain embodiments, a schematic illustration of a method where species are charged by a charge generator positioned downstream of a collector.
Figure 2C:
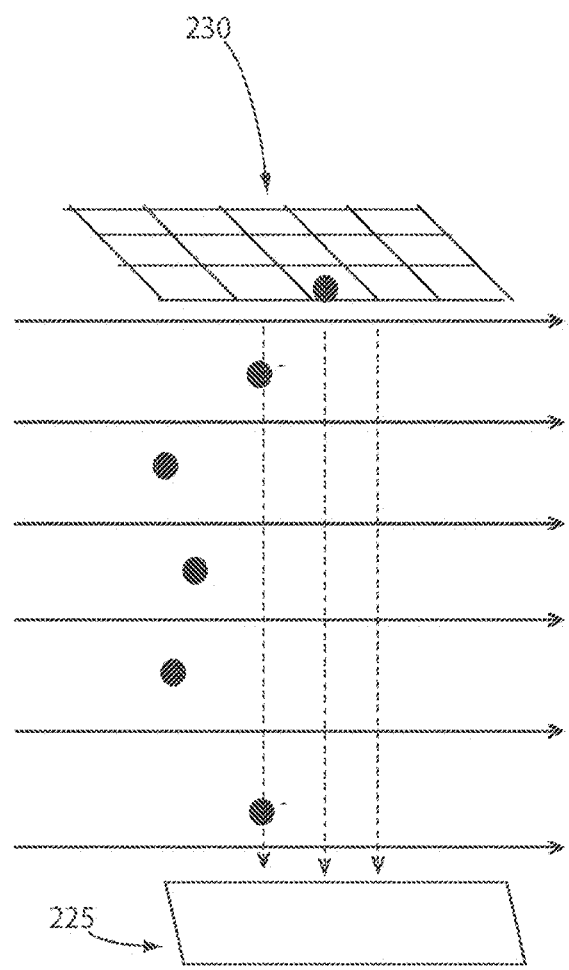
FIG. 2C shows a schematic illustration of a method where species are charged by a charge generator positioned neither upstream nor downstream of a collector, according to certain embodiments.

As described above, in certain embodiments an electrode may be used to remove at least a portion of a charged species from a gas stream. Some embodiments may comprise both a means for generating space charge and an electrode to collect the charged species. The means for generating space charge and the collector may be positioned in any suitable manner with respect to each other and with respect to the gas stream. For example, in some embodiments, as shown in FIG. 2A, charge generator 225 (e.g., a first electrode) used to charge the gas stream is positioned upstream of collector 230 (e.g., a second electrode) used to collect the plurality of species present within the gas stream. In some embodiments, the first electrode is positioned proximate the second electrode. In certain embodiments, as shown in FIG. 2B, generator 225 may be positioned downstream of collector 230. In some embodiments, as shown in FIG. 2C, generator 225 may be positioned neither upstream nor downstream of collector 230. Other arrangements of the charge generator with respect to the collector are also possible. Additionally, while FIGS. 2A-C each show the generation of negatively charged species by the charge generator, embodiments in which the charge generator generates positively charged species should also be understood to be encompassed by the invention.

In embodiments comprising at least a charge generator (i.e. a charge generator) and a collection electrode (i.e. a collector), the minimum distance between the charge generator and the collection electrode may be any suitable value. In some embodiments, the charge generator and the collection electrode may be relatively close together. For example, the minimum distance between charge generator and the collection electrode may be less than or equal to 50 cm, less than or equal to 40 cm, less than or equal to 25 cm, less than or equal to 20 cm, less than or equal to 15 cm, less than or equal to 10 cm, less than or equal to 5 cm, or less than or equal to 4 cm. In accordance with some embodiments, the minimum distance between the charge generator and the collection electrode may be greater than or equal to 2 cm, greater than or equal to 4 cm, greater than or equal to 5 cm, greater than or equal to 10 cm, greater than or equal to 15 cm, greater than or equal to 20 cm, greater than or equal to 25 cm, or greater than or equal to 40 cm. Combinations of the above-referenced ranges are also possible (e.g., less than or equal to 50 cm and greater than or equal to 2 cm, or less than or equal to 15 cm and greater than or equal to 4 cm). Other ranges are also possible.

In some embodiments, a plurality of charged species may be collected by more than one collector. For example, there may be two, three, or more collectors. Without wishing to be bound by theory, it is believed that the presence of additional collectors may improve the collection efficiency and/or energy efficiency. In some embodiments, the collectors may be positioned successively downstream of each other.

In certain embodiments, collectors (e.g., electrodes) positioned downstream may have relatively larger absolute values of potential than electrodes positioned upstream (e.g., the first electrode may have a potential of +5 V and the second electrode may have a potential of +10 V, or the first electrode may have a potential of −5 V and the second electrode may have a potential of −10 V, etc.). This may allow the charged species to be subject to increasing levels of force towards a collector as they flow through the system. For instance, it may be possible for a second collector to collect a portion of the charged species that are not collected by the first electrode, and/or for a third collector to collect a portion of the charged species that are not collected by the first and second electrode, etc.

According to some embodiments, the species may be charged by more than one charge generator. The species may be charged by two, three, or more charge generators (e.g., electrodes). Each charge generator may be independently positioned either upstream or downstream of any fraction of the collectors. In some embodiments, a first charge generator may be positioned upstream of all collectors and a second charge generator may be positioned downstream of at least a first collector. In this configuration, the first charge generator may charge at least a portion of the species before the species flows through any collectors and the second charge generator may charge at least a portion of the species not captured by at least the first collector. Without wishing to be bound by theory, mechanisms for the collection of species with this design may allow for species that are not charged by the first charge generator to be charged by the second charge generator and subsequently collected.

In certain embodiments, the charge generator comprises at least one electrode. The electrode may be held at a potential such that corona discharge occurs and space charge is generated. The corona discharge may cause ionization of at least a portion of the air stream. The space charge present due to corona discharge may cause the species to become charged. In some such embodiments, the difference in potential between the first electrode (e.g., which charges the species by generating corona discharge) and the second electrode (e.g., which collects the species) may result in the formation of an electric field which directs the charged species towards the second electrode.

In an exemplary embodiment, the charge generator comprises two or more electrodes, three or more electrodes, or four or more electrodes. For example, in some embodiments, the charge generator may comprise a third electrode positioned downstream of the second electrode. In some cases, the third electrode is capable of charging the species.

Figure 3:
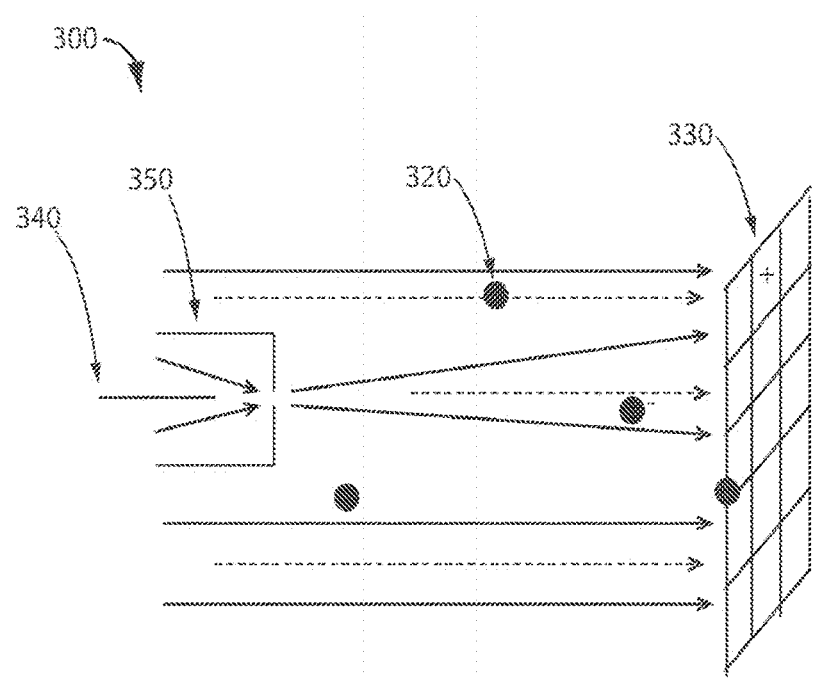
FIG. 3 shows a schematic illustration of a method where an emitter that does not contribute to the applied electric field is used to charge species, according to certain embodiments.

In some embodiments, the charge generator does not contribute to the electric field used to collect the charged species. For instance, the species may be charged by a device that is not an electrode, or it may be charged by a combination of electrodes that together do not generate an appreciable electric field outside the charging region. One non-limiting example of such an article is the pair of an emitter and a grounded electrode, which together compose the charge generator. After passing through the emitter and grounded electrode, the species may be charged and can then be attracted towards an electrode of opposite charge (i.e., the collector). As depicted schematically in FIG. 3, gas stream 300 comprises a plurality of species 320. In some embodiments, emitter 340 and grounded electrode 350 are used to generate charged species (but overall do not generate an electric field outside of the grounded electrode). In some embodiments, the grounded electrode may be a perforated plate (e.g., as depicted in FIG. 3), although other geometries are also envisioned. Collector 330 can be held, in some cases, at the opposite charge to the charge generated on the species so that it can attract and collect the species (e.g., as shown in FIG. 3, the species can be negatively charged by the emitter and collector 330 can be held at positive charge; however, positively charged species attracted to negatively charged electrodes are also contemplated).

In certain embodiments, the charge generator may comprise charged fluids. For example, a potential may be applied to an ionic liquid such that a Taylor cone is generated. The gas stream comprising the species may flow through the Taylor cone such that at least a portion of the charge therein is transferred to the species. In some embodiments, ions may be ejected from a surface of the Taylor cone (e.g., a tip) and form a space charge around the surface of the Taylor cone. In certain embodiments, the gas stream comprising the species may flow through the generated space charge such that at least a portion of the charge therein is transferred to the species.

In some embodiments, the charge generator may comprise electrospray ionization. A volatile liquid may be electrosprayed. In some embodiments, droplets having a net electric charge are sprayed from the charge generator. In some such embodiments, at least a portion of the sprayed droplets evaporate, leaving free ions, such that a space charge is created. The gas stream comprising the species may flow through the generated space charge such that at least a portion of the charge therein is transferred to the species.

As described above, the inventive systems and methods described herein may provide for the collection of charged species at relatively high collection efficiencies and/or high energy efficiencies. The species may be collected in any suitable manner. As used herein, collection refers to the accumulation of the species at a defined location such that it can later be removed. In some embodiments, collection of the species may comprise the use of a collector. In some embodiments, the species may be at least partially collected on an upstream surface of a collector. In some embodiments, the species may be at least partially collected on a downstream surface of a collector. In certain embodiments, the species may be at least partially collected on a surface of a collector facing a charge generating mechanism. In certain embodiments, the species may be at least partially collected on a surface of a collector not facing a charge generating mechanism. The collector may be any suitable material that is at a potential such that it will interact with the species such that the species is attracted to the electrode. Features of the collector, such as its design, will be discussed more fully below.

According to certain embodiments, collecting the species may further comprise directing the species from a portion of the collector at which it is collected to a different portion of the collector. This may be accomplished, for example, with the aid of any suitable device, non-limiting examples of which include gutters, drains, storage containers, etc. In some embodiments, collecting the species may further comprise removing the species from the collector. For instance, a gutter on a collector may cause the collected species to flow to a storage container, a drain pipe, or the like.

As described above, in certain embodiments collecting the species comprises using an electric field between a first electrode and a second electrode to attract the species to the second electrode. In certain embodiments, the first electrode may be positively charged and the second electrode may be negatively charged or may be grounded. In some embodiments, the first electrode may be negatively charged and the second electrode may be positively charged or may be grounded. In certain embodiments, it may be advantageous for the first electrode to be negatively charged. Without wishing to be bound by theory, a negatively charged first electrode may be capable of generating corona discharge that comprises ozone, thus exposing the air stream to ozone. It may be beneficial to both charge a species and generate ozone, because ozone may be capable of killing at least some microorganisms. Accordingly, a first electrode that generates ozone may be capable of at least partially disinfecting and/or purifying the species.

In some embodiments, one or more electrodes is held at a potential that has a relatively low absolute value. Any suitable means may be utilized to hold one or more electrodes at a target value, such as a power source. In some embodiments, a power source may be placed in electrical communication with one or more electrodes (e.g., at least the first electrode).

The power source may be a generator, a battery, etc. In certain embodiments, one or more of the electrodes is held at a potential with an absolute value of less than or equal to 100 kV, less than or equal to 75 kV, less than or equal to 50 kV, less than or equal to 30 kV, less than or equal to 25 kV, less than or equal to 20 kV, less than or equal to 15 kV, less than or equal to 10 kV, or less than or equal to 5 kV. In certain embodiments, one or more of the electrodes is held at a potential with an absolute value of greater than or equal to 2 kV, greater than or equal to 5 kV, greater than or equal to 10 kV, greater than or equal to 15 kV, greater than or equal to 20 kV, greater than or equal to 25 kV, greater than or equal to 30 kV, greater than or equal to 50 kV, or greater than or equal to 75 kV. Combinations of the above-referenced ranges are also possible (e.g., greater than or equal to 2 kV and less than or equal to 100 kV, or greater than or equal to 5 kV and less than or equal to 30 kV). Other ranges are also possible. It should also be understood that the values above refer to absolute values (e.g., an electrode held at a potential with an absolute value of 2 kV may be held at a potential of +2 kV or may be held at a potential of −2 kV).

In accordance with certain embodiments, the absolute value of the difference in potential between an electrode that serves as an emitter and an electrode that serves as a collector is relatively low. In some embodiments, the absolute value of the difference in potential between an electrode that serves as an emitter and an electrode that serves as a collector is less than or equal to 100 kV, less than or equal to less than or equal to 75 kV, less than or equal to 50 kV, less than or equal to 30 kV, less than or equal to 25 kV, less than or equal to 20 kV, less than or equal to 15 kV, less than or equal to 10 kV, or less than or equal to 5 kV. In certain embodiments, the absolute value of the difference in potential between an electrode that serves as an emitter and an electrode that serves as a collector is greater than or equal to 2 kV, greater than or equal to 5 kV, greater than or equal to 10 kV, greater than or equal to 15 kV, greater than or equal to 20 kV, greater than or equal to 25 kV, greater than or equal to 30 kV, greater than or equal to 50 kV, or greater than or equal to 75 kV. Combinations of the above-referenced ranges are also possible (e.g., greater than or equal to 2 kV and less than or equal to 100 kV, or greater than or equal to 5 kV and less than or equal to 30 kV). Other ranges are also possible. It should also be understood that the values above refer to absolute values (e.g., an absolute value of the difference in potential of 2 kV may be a difference in potential of +2 kV or may be a difference in potential of −2 kV). In some embodiments, the plurality of charged species is electrically biased against the collector. The phrase electrically biased against generally refers to having an electrical potential such that there is a force of attraction (e.g., to the collector). For instance, the charged species may be electrically biased against the collector when it is at a potential such that it is attracted to the collector. The absolute value of the electrical bias generally refers to the absolute value of the difference in potential between the two articles that are biased against each other. In some embodiments, absolute value of the electrical bias between the plurality of charged species and the collector is greater than or equal to 2 kV, greater than or equal to 5 kV, greater than or equal to 10 kV, greater than or equal to 15 kV, greater than or equal to 20 kV, greater than or equal to 25 kV, greater than or equal to 30 kV, greater than or equal to 50 kV, or greater than or equal to 75 kV. In some embodiments, the absolute value of the electrical bias between the plurality of charged species and the collector is less than or equal to 100 kV, less than or equal to less than or equal to 75 kV, less than or equal to 50 kV, less than or equal to 30 kV, less than or equal to 25 kV, less than or equal to 20 kV, less than or equal to 15 kV, less than or equal to 10 kV, or less than or equal to 5 kV. Combinations of the above-referenced ranges are also possible (e.g., greater than or equal to 2 kV and less than or equal to 100 kV, or greater than or equal to 5 kV and less than or equal to 30 kV). Other ranges are also possible. It should also be understood that the values above refer to absolute values (e.g., an absolute value of the electrical bias of 2 kV may be an electrical bias of +2 kV or may be an electrical bias of −2 kV).

In certain embodiments, the apparatus for collecting the species may be operated while consuming a relatively low amount of power (per surface area of the collector). In some embodiments, the apparatus may be operated at a power of less than or equal to 5000 W/m$^2$, less than or equal to 4000 W/m$^2$, 3000 W/m$^2$, 2000 W/m$^2$, 1000 W/m$^2$, less than or equal to 750 W/m$^2$, less than or equal to 500 W/m$^2$, less than or equal to 200 W/m$^2$, less than or equal to 150 W/m$^2$, less than or equal to 100 W/m$^2$, less than or equal to 75 W/m$^2$, less than or equal to 50 W/m$^2$, less than or equal to 25 W/m$^2$, less than or equal to 20 W/m$^2$, less than or equal to 15 W/m$^2$, less than or equal to 10 W/m$^2$, less than or equal to 5 W/m$^2$, less than or equal to 2.5 W/m$^2$, less than or equal to 1 W/m$^2$, less than or equal to 0.5 W/m$^2$, or less than or equal to 0.25 W/m$^2$. In some embodiments, the apparatus may be operated at a power of greater than or equal to 0.1 W/m$^2$, greater than or equal to 0.25 W/m$^2$, greater than or equal to 0.5 W/m$^2$, greater than or equal to 1 W/m$^2$, greater than or equal to 2.5 W/m$^2$, greater than or equal to 5 W/m$^2$, greater than or equal to 10 W/m$^2$, greater than or equal to 15 W/m$^2$, greater than or equal to 20 W/m$^2$, greater than or equal to 25 W/m$^2$, greater than or equal to 50 W/m$^2$, greater than or equal to 75 W/m$^2$, greater than or equal to 100 W/m$^2$, greater than or equal to 150 W/m$^2$, greater than or equal to 200 W/m$^2$, greater than or equal to 500 W/m$^2$, greater than or equal to 750 W/m$^2$, greater than or equal to 1000 W/m$^2$, greater than or equal to 2000 W/m$^2$, greater than or equal to 3000 W/m$^2$, or greater than or equal to 4000 W/m$^2$. Combinations of the above-referenced ranges are also possible (e.g., less than or equal to 200 W/m$^2$ and greater than or equal to 0.1 W/m$^2$, less than or equal to 1 W/m$^2$ and greater than or equal to 50 W/m$^2$, or less than or equal to 5000 W/m$^2$ and greater than or equal to 1 W/m$^2$). Other ranges are also possible. In an exemplary embodiment, the apparatus may be operated at a power of less than or equal to 200 W/m$^2$ and greater than or equal to 0.1 W/m$^2$.

In some embodiments, a first electrode (e.g., a charge generator that is capable of at least partially charging the species present within the gas stream) may comprise needles and/or materials which comprise a surface with a relatively high radius of curvature. Without wishing to be bound by theory, a relatively high radius of curvature may be useful for generating a corona discharge because it may result in a large potential gradient. In certain embodiments, a first electrode may comprise a surface with a radius of curvature of greater than or equal to 2 microns, greater than or equal to 5 microns, greater than or equal to 10 microns, greater than or equal to 15 microns, greater than or equal to 20 microns, greater than or equal to 50 microns, greater than or equal to 100 microns, greater than or equal to 250 microns, greater than or equal to 500 microns, greater than or equal to 1 mm, or greater than or equal to 2.5 mm. In certain embodiments, a first electrode may comprise a surface with a radius of curvature of less than or equal to 5 mm, less than or equal to 2.5 mm, less than or equal to 1 mm, less than or equal to 500 microns, less than or equal to 250 microns, less than or equal to 100 microns, less than or equal to 50 microns, less than or equal to 20 microns, less than or equal to 15 microns, or less than or equal to 10 microns, less than or equal to 5 microns. Combinations of the above-referenced ranges are also possible (e.g., greater than or equal to 2 microns and less than or equal to 250 microns, or greater than or equal to 100 microns and less than or equal to 5 mm). Other ranges are also possible.

In certain embodiments, the system may comprise two or more charge generators. For example, in some embodiments, a first electrode comprises a plurality of needles (e.g., charge generators). For instance, the first electrode may comprise an array of needles. The ratio of the spacing between the needles (or other charge generators) to the distance from the needles to a second electrode may be any suitable value. In some embodiments, ratio of the spacing between the needles to the distance from the needles to a second electrode may be greater than or equal to 0.25, greater than or equal to 0.5, greater than or equal to 1, greater than or equal to 2.5, greater than or equal to 5, or greater than or equal to 10. In some embodiments, the ratio of the spacing between the needles to the distance from the needles to a second electrode may be less than or equal to 15, less than or equal to 10, less than or equal to 5, less than or equal to 2.5, less than or equal to 1, or less than or equal to 0.5. Combinations of the above-referenced ranges are also possible (e.g., greater than or equal to 0.25 and less than or equal to 15, or greater than or equal to 0.5 and less than or equal to 5). Other ranges are also possible. In some embodiments, the spacing between charge generators is selected such that breakdown and/or arcing do not occur.

In some embodiments, one or more electrodes may comprise a mesh. For example, in some embodiments, the charge generator comprises a mesh. In some In some embodiments, one or more second electrodes (i.e., collectors) may comprise a mesh. Suitable features of meshes will be described more fully below, and it should be understood that these features may be present in either, both, or none of a first and second electrode.

Figure 4A:
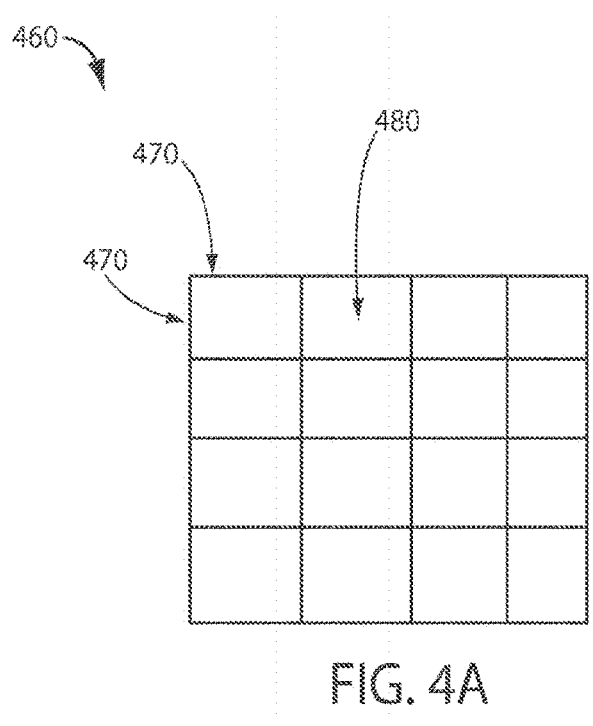
FIG. 4A shows a schematic illustration of a mesh, according to one set of embodiments.
Figure 4B:
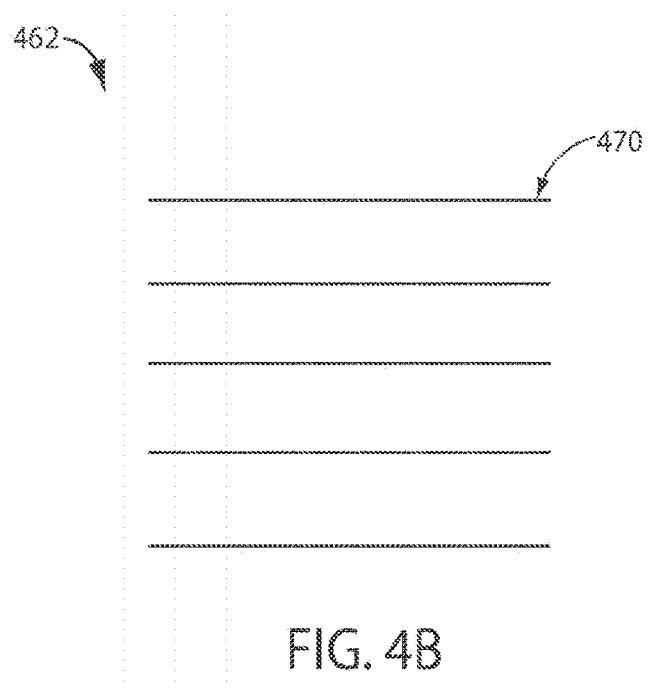
FIG. 4B shows a schematic illustration of a mesh, in accordance with some embodiments.

As shown in FIG. 4A, mesh 460 may comprise plurality of wires 470 and openings 480. It should be noted that while mesh 460 is depicted as a square mesh, other mesh lattices are also contemplated (e.g., triangular, rectangular, hexagonal, non-periodic, etc.). In some embodiments, the mesh may only comprise substantially parallel wires (e.g., mesh 462 as shown in FIG. 4B comprising wires 470).

The openings in a mesh may have any suitable average minimum cross-sectional dimension. In some embodiments, the openings may have an average minimum cross-sectional dimension of greater than or equal to 10 microns, greater than or equal to 20 microns, greater than or equal to 50 microns, greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 25 mm, greater than or equal to 50 mm, or greater than or equal to 75 mm. In some embodiments, the openings may have an average minimum cross-sectional dimension of less than or equal to 100 mm, less than or equal to 75 mm, less than or equal to 50 mm, less than or equal to 25 mm, less than or equal to 10 mm, less than or equal to 5 mm, less than or equal to 2 mm, less than or equal to 1 mm, less than or equal to 500 microns, less than or equal to 200 microns, less than or equal to 100 microns, less than or equal to 50 microns, or less than or equal to 20 microns. Combinations of the above-referenced ranges are also possible (e.g., greater than or equal to 10 microns and less than or equal to 1 mm, greater than or equal to 100 microns and less than or equal to 5 mm, greater than or equal to 500 microns and less than or equal to 2 mm, greater than or equal to 1 mm and less than or equal to 25 mm, or greater than or equal to 2 mm and less than or equal to 100 mm). Other ranges are also possible.

In some embodiments, the average minimum cross-sectional dimension of the openings may be designed such that the average minimum cross-sectional dimension is defined by:

$$D^* = \frac{D + 2R_c}{2R_c} < Ke/5,$$

where $D^*$ is the average minimum cross-sectional dimension of the openings, $R_c$ is the average cross-sectional dimension of the wires, $K_e$ is the ratio of electric and viscous forces defined by:

$$Ke = \frac{2R_p \epsilon_0 V^2}{\eta_g DR_c \left(U_0 + \frac{2R_p}{\eta_g}\epsilon_0 \frac{V^2}{d^2}\right)},$$

wherein:

$R_p$ is the radius of the fog particles, $\epsilon_0$ is the permittivity of free space, V is the voltage difference between the emitter and the electrode, $\eta_g$ is the viscosity of the air, D is the distance between the emitter and the collector, and $U_0$ is the wind speed.

The average cross-sectional dimension of the wires may be any suitable value. In some embodiments, the average cross-sectional dimension of the wires is greater than or equal to 0.5 mm, greater than or equal to 10 microns, greater than or equal to 20 microns, greater than or equal to 50 microns, greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 25 mm, greater than or equal to 50 mm, or greater than or equal to 75 mm. In some embodiments, the average cross-sectional dimension of the wires is less than or equal to 100 mm, less than or equal to less than or equal to 75 mm, less than or equal to 50 mm, less than or equal to 25 mm, less than or equal to 10 mm, less than or equal to 5 mm, less than or equal to 2 mm, less than or equal to 1 mm, less than or equal to 500 microns, less than or equal to 200 microns, less than or equal to 100 microns, less than or equal to 50 microns, or less than or equal to 20 microns. Combinations of the above-referenced ranges are also possible (e.g., greater than or equal to 10 microns and less than or equal to 1 mm, greater than or equal to 100 microns and less than or equal to 5 mm, greater than or equal to 500 microns and less than or equal to 2 mm, greater than or equal to 1 mm and less than or equal to 25 mm, or greater than or equal to 0.5 mm and less than or equal to 100 mm). Other ranges are also possible.

In some embodiments, the system may be designed such that the collection efficiency is defined by:

$$\eta = \frac{SC}{1 + \left[1.22\left(1.3SC + \left(\frac{SC}{1 - SC}\right)^2\right)\right]} \frac{Ke}{10},$$

wherein SC is the fraction of the area occupied by the wires of the collector divided by the total area of the collector.

In certain embodiments, openings occupy a relatively high area fraction of the porous substrate (e.g., mesh). As used herein, the area fraction is determined by measuring the total surface area occupied by the openings divided by the largest surface area of the porous substrate including openings, expressed as a percentage. In accordance with some embodiments the openings occupy an area fraction of the mesh of greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95%, greater than or equal to 98%, greater than or equal to 99%, or greater than or equal to 99.5%. In accordance with some embodiments, the openings occupy an area fraction of the mesh of less than or equal to 99.9%, less than or equal to 99.5%, less than or equal to 99%, less than or equal to 98%, less than or equal to 95%, less than or equal to 90%, less than 80%, less than 70%, less than 60%, less than 50%, less than 40%, or less than 30%. Combinations of the above-referenced ranges are also possible (e.g., greater than or equal to 20% and less than or equal to 50%, greater than or equal to 40% and less than or equal to 70%, greater than or equal to 60% and less than or equal to 90%, or greater than or equal to 80% and less than or equal to 99.9%). Other ranges are also possible.

In certain embodiments, one or more of the parameters described above (e.g., electrode voltage, opening diameter, etc.) in relation to a first (i.e., emitter) and second (i.e., collection) electrode may be varied dynamically during collection of the species. For example, one or more of the parameters described above may be varied in response to changing environmental conditions such that collection efficiency and/or energy efficiency is maximized. In some embodiments, sensors may be incorporated into the collection device that are capable of sensing the concentration of species in the gas stream, the humidity, the wind direction, the wind magnitude, etc. Then, one or more electrodes and/or wires may be moved, or the potential applied to one or more electrodes may be modified.

The species to be collected may comprise any suitable compounds. In certain embodiments, the species to be collected may comprise a liquid. In some embodiments, the species to be collected may comprise water (e.g., in liquid, solid, and/or gaseous form). The water may be substantially pure water, and/or it may comprise one or more dissolved species present within the water. According to some embodiments, the species to be collected may comprise fog. In certain embodiments, the species to be collected may comprise an organic compound.

In certain embodiments, the species may comprise liquid droplets. The liquid droplets may have any suitable average diameter. In some embodiments, the species may comprise liquid droplets with an average diameter of greater than or equal to 100 nm, greater than or equal to 250 nm, greater than or equal to 500 nm, greater than or equal to 1 micron, greater than or equal to 2 microns, greater than or equal to 5 microns, greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, greater than or equal to 50 microns, greater than or equal to 100 microns, greater than or equal to 250 microns, or greater than or equal to 500 microns. In certain embodiments, the species may comprise liquid droplets with an average diameter of less than or equal to 1 mm, less than or equal to 500 microns, less than or equal to 250 microns, less than or equal to 100 microns, less than or equal to 50 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 5 microns, less than or equal to 2 microns, less than or equal to 1 micron, less than or equal to 500 nm, or less than or equal to 250 nm. Combinations of the above-referenced ranges are also possible (e.g., greater than or equal to 100 nm and less than or equal to 1 micron, greater than or equal to 250 nm and less than or equal to 10 microns, greater than or equal to 1 micron and less than or equal to 40 microns, greater than or equal to 1 micron and less than or equal to 100 microns, greater than or equal to 10 microns and less than or equal to 500 microns, or greater than or equal to 250 microns and less than or equal to 1 mm). Other ranges are also possible.

The gas stream may comprise any suitable gaseous species. In certain embodiments, the gaseous species may comprise air. Other gaseous species are also possible. Those skilled in the art would be capable of selecting suitable gas streams and gaseous species which comprise a species to be collected based upon the teachings of this specification.

In an exemplary embodiment, the system comprises a first electrode and a second electrode configured to be positioned proximate the first electrode, a power source in electrical communication with at least the first electrode, and a collector. In some embodiments, the system is configured to collect a fluid with an energy efficiency of greater than or equal to 1 liter per kWh of energy applied in creating the field and/or a collection efficiency of greater than or equal to 10%.

In another exemplary embodiment, a species present in a gas stream may be collected by establishing a plurality of charged species in the gas stream, electrically biased against a collector and collecting the charged species. In some embodiments, the charged species is collected at the collector at a collection efficiency of greater than or equal to 10%.

In yet another exemplary embodiment, at least a first and second electrode may be arranged so as to apply an electric field to at least a portion of a gas stream thereby urging a species contained with the gas stream toward the second electrode. In some embodiments, at least a portion of the species may be isolated from the gas stream. In certain embodiments, a distance between the first electrode and the second electrode is between 2 cm and 50 cm.

In another exemplary embodiment, a species present in a gas stream may be collected by arranging, within the gas stream, a first electrode and a second electrode proximate the first electrode, applying a potential to the first electrode such that at least a portion of the fluid present in the gas stream deposits on the second electrode, and collecting the fluid. In some embodiments, the distance between the first electrode and the second electrode is between 2 cm and 50 cm. In certain embodiments, the species is collected at an energy efficiency of greater than or equal to 1 liter per kWh of energy applied in creating the field.

U.S. Provisional Patent Application Ser. No. 62/233,499, filed Sep. 28, 2015 and entitled "Enhanced Fog Collection with Corona Discharge," is incorporated herein by reference in its entirety for all purposes.

EXAMPLES

The most common design for fog collectors is a large woven mesh that stands perpendicular to the fog-laden wind, held by a frame. The wind blows fog into the mesh wires. Upon impact on the wires, droplets stick to the mesh, coalesce with other incoming droplets to become bigger, and when they reach a certain size, they are shed by gravity into a gutter and are eventually carried to a collection tank. Meshes are used instead of plates because a large impermeable obstacle would lead to a deviation of the incoming streamlines and consequently to the drag of the fog droplets away from the plate, whereas a mesh causes a much smaller alteration of the flow by letting air pass through its openings. Meshes used in practice are made of polyethylene or polypropylene. Their collection rates largely vary from location to other, but the typical values in actual systems range from 1 to 10 L/m²/day. The collection efficiency of a collector can be measured by calculating the ratio between the rate of water collection in the gutter and the rate of water flowing in an unperturbed stream tube with the same area as the mesh. Many reasons may explain why the efficiency cannot be 100%. First, for example, only the part of the droplets that impacts the mesh wires can be captured. The rest of the flow goes through the opening of the mesh and is never captured. Then, among the droplets that impact the wires, some can bounce on the wire and go away or be captured then re-entrained by the wind before they shed due to gravity. Another problem is that collected droplets that did not shed yet can partially clog the mesh openings and form a large impermeable area that deviates incoming streamlines. The meshes can be characterized by the wire opening and the shade coefficient, which is the projected area (surface area) of the wires divided by the total area of the mesh. By tuning these two parameters, a balance can be found between minimizing streamlines deviation and maximizing the fraction of droplets that impact wires, to have a maximum efficiency.

The most common design for fog collectors is a large woven mesh that stands perpendicular to the fog-laden wind, held by a frame. The wind blows the fog into the mesh wires. Fog is a cloud touching the ground, composed of tiny droplets of diameters ranging from 1 to 40 μm with a typical diameter of 10 μm. Upon impact on the wires, droplets stick to the mesh, coalesce with other incoming droplets to grow bigger, and when they reach a critical size, they are shed by gravity into a gutter and are eventually carried to a collection tank. Meshes are used instead of plates because a large impermeable obstacle may lead to a deviation of the incoming streamlines and consequently to the drag of the fog droplets away from the plate, whereas a mesh causes a much smaller alteration of the flow by letting air pass through its openings. Nevertheless, these meshes typically have very low efficiencies, around 1-2%.

Several mechanisms limit the efficiency of such collectors. The deviation of the streamlines around the collector is one of them and constitutes the "aerodynamic efficiency" of the system. The collector, of size L, may deviate the flow in a region of size L around it, thereby diminishing the number of fog particles directed towards it. The actual number of particles directed towards the mesh wires divided by the total number of particles that were directed towards the collector far from it is the aerodynamic efficiency, and this efficiency depends on the shading coefficient (SC) of the mesh, which is the fraction of the projected area (surface area) occupied by the mesh wires. A high SC may lead to a plate-like situation where the streamlines are greatly deviated, while a small SC may lead to a small efficiency because most of the droplets may pass through the mesh openings. It has been shown that a SC around 55% leads to a maximum aerodynamic efficiency.

Another limitation to efficiency is the shedding rate. If captured droplets on the mesh cannot shed easily by gravity and remain on the mesh they can decrease the efficiency by two mechanisms. The mesh openings can be clogged by water making the mesh locally act as a plate. Re-entrainment of the droplets due to wind drag may also happen before these droplets are collected. Improving the shedding rate has recently received significant attention, and researchers have studied fog-harvesting animals and plants for inspiration and developed coatings to improve the shedding rates. Significant improvements have been reported. However, the overall efficiency of these meshes remained low, around 10%, suggesting that the main limitation is not the shedding rate.

A significant bottleneck in the fog collection process is the deviation of the droplets around the individual wires of the mesh, captured by the deposition efficiency, which is the fraction of droplets directed towards the wire that are collected. The flow past a cylinder has been extensively studied. Far from the cylinder the air streamlines are parallel and the fog particles' trajectories follow them closely. Close to the cylinder, in a region of characteristic size the radius of the cylinder $R_c$, the streamlines start deviating and going around the cylinder, as schematically shown in FIG. 5A. In this region, fog particles are subject to two forces: their inertia and drag forces exerted by the air, and their fate may depend on the ratio of these forces. This ratio is the Stokes number that can also be seen as the ratio of the particle's timescale to the flow's timescale.

$$St = \frac{\tau_{particle}}{\tau_{flow}} = \frac{\text{Inertia}}{\text{Drag}} = \frac{2R_p^2\rho_w U}{9\eta_g R_c}.$$

For low Stokes numbers, the particles trajectories may follow the streamlines very closely, and few droplets will be collected. An example is presented in the photograph of FIG. 5A that shows the fog trajectories around a cylinder for St=0.05, with flow separation. For high Stokes, the drag forces may not affect the trajectories, and the droplets facing the cylinder may continue their parallel horizontal movement and collide with the cylinder. An empirical formula has been established for the deposition efficiency:

$$\eta_d = \frac{St}{St + \frac{\pi}{2}}.$$

In practice, however, very fine meshes, which are difficult to make, are needed to have large Stokes numbers, and low deposition efficiencies may significantly limit the fog collection rate.

In some cases, electrostatics have been proposed for the purpose of fog abatement in roads and airports where it may be dangerous because it reduces the visibility and enhances the risk for accidents. These designs generally aim to clear relatively large areas from fog and thus significantly distort the fog trajectory over large distances (up to 500 m in some of the designs).

Other prior methods use a high voltage needle and a grounded plate and, since water molecules are polar, they align with the electric field and move towards the regions of highest field, i.e. the needle where the droplets coalesce and grow. As they become larger, they also acquire charge from the needle by conduction. At a certain point, the electrostatic repulsion overcomes the adhesion force and the droplet leaves the needle and is transported towards the collector under the influence of the electric field. However, one exemplary disadvantage of this method is that charging the droplets requires contact with the needle, which can be rapidly covered with water. This may limit the performance of the system and the collection rate, and/or may require a large number of needles, which is energy consuming.

By contrast, in embodiments described herein, electric fields cause relatively slight deflections in fog trajectories, allowing droplets to hit the collection meshes rather of passing between the wires, resulting in, for example, increased collection efficiency (e.g., a collection efficiency of greater than or equal to 10%). In addition, the methods and systems described herein intend not to remove and get rid of the fog but to collect it and disinfect it in situ to, for example, produce water that is usable for drinking and irrigation.

A novel method leading to enhanced fog collection with minimal power consumption is described herein. In one example, the system consists of two electrodes: The first one, the emitter electrode, is a needle or an array of needles, a needle being a conductive object with a small radius of curvature, maintained at a high voltage (order of magnitude: 5-25 kV). The second electrode is the collector, and it is placed close to the first one and consists in a grounded conductive mesh or plate. The collector is perpendicular to the wind transporting fog droplets and the high voltage needles are placed either just before or just after the collector in the direction of the wind. The high voltage at the first electrode causes corona discharge to occur at its vicinity. A cloud of space charges is generated and accelerated towards the droplets. They attach to water droplets and the droplets become charged with the same sign as the emitter electrode. These charged droplets are then attracted to the grounded collector under the influence of the electric field between the two electrodes. This additional force drives the fog droplets to the collector. When a droplet arrives at the mesh/plate it is captured and as soon as a few drops coalesce and become large enough to be shed by gravity, they drop and are collected in a gutter that transports them to a storage tank.

Far from the collector, the fog droplets follow the air streamlines. As the wind approaches the collector, in the absence of electric field, the streamlines deflect to avoid the obstacle. If the collector is an impermeable plate, they deflect greatly and entrain a large quantity of droplets. If the collector is a mesh, streamlines can pass through the openings, and they slightly deflect around the mesh wires. But, as the water drops have more inertia than the air, they are deflected more slowly than the air and they can hit the mesh fibers. When the droplets are charged due to corona discharge, the collector attracts them and their trajectories are modified and oriented towards the surface of the collector. Many droplets that would have been deflected and passed through the mesh openings can now be collected since the attractive electric force can overcome the drag force exerted by the air. FIG. 5A and FIG. 5B show the mechanism by which electrostatic forces may overcome hydrodynamic forces and attract droplets towards the collector. The trajectories of the fog droplets are modified and are no longer the hydrodynamic streamlines.

Figure 5A:
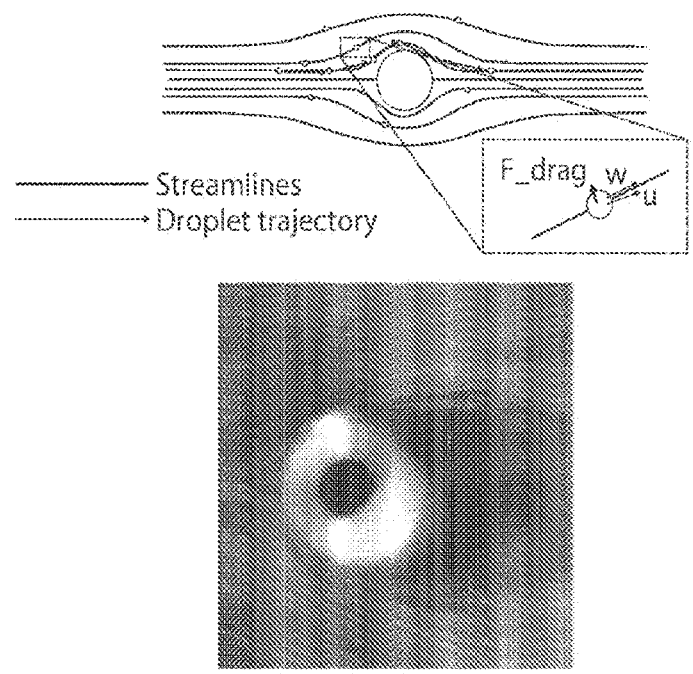
FIG. 5A shows, according to certain embodiments, a schematic of streamlines and particle trajectories and a photograph of particle trajectories in the absence of an applied electric field.
Figure 5B:
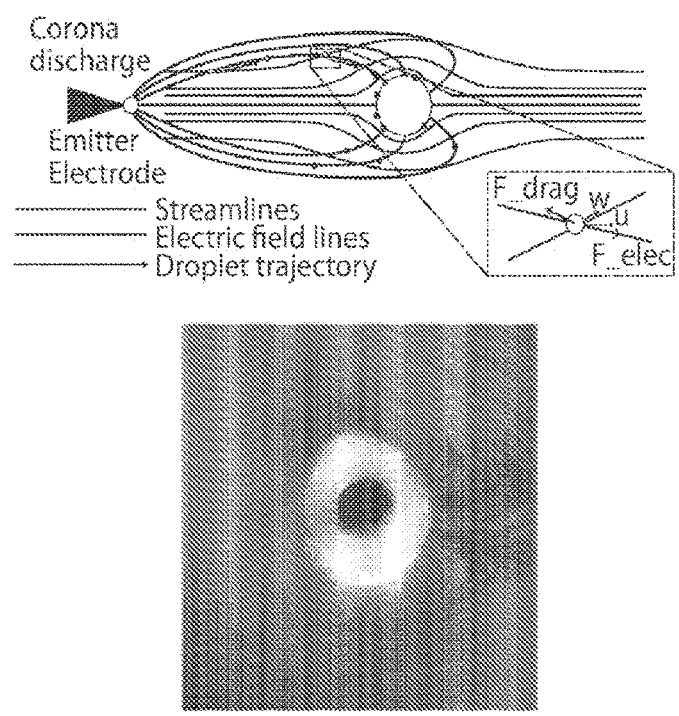
FIG. 5B shows, in accordance with certain embodiments, a schematic of streamlines and particle trajectories and a photograph of particle trajectories in the presence of an applied electric field.
Figure 6:
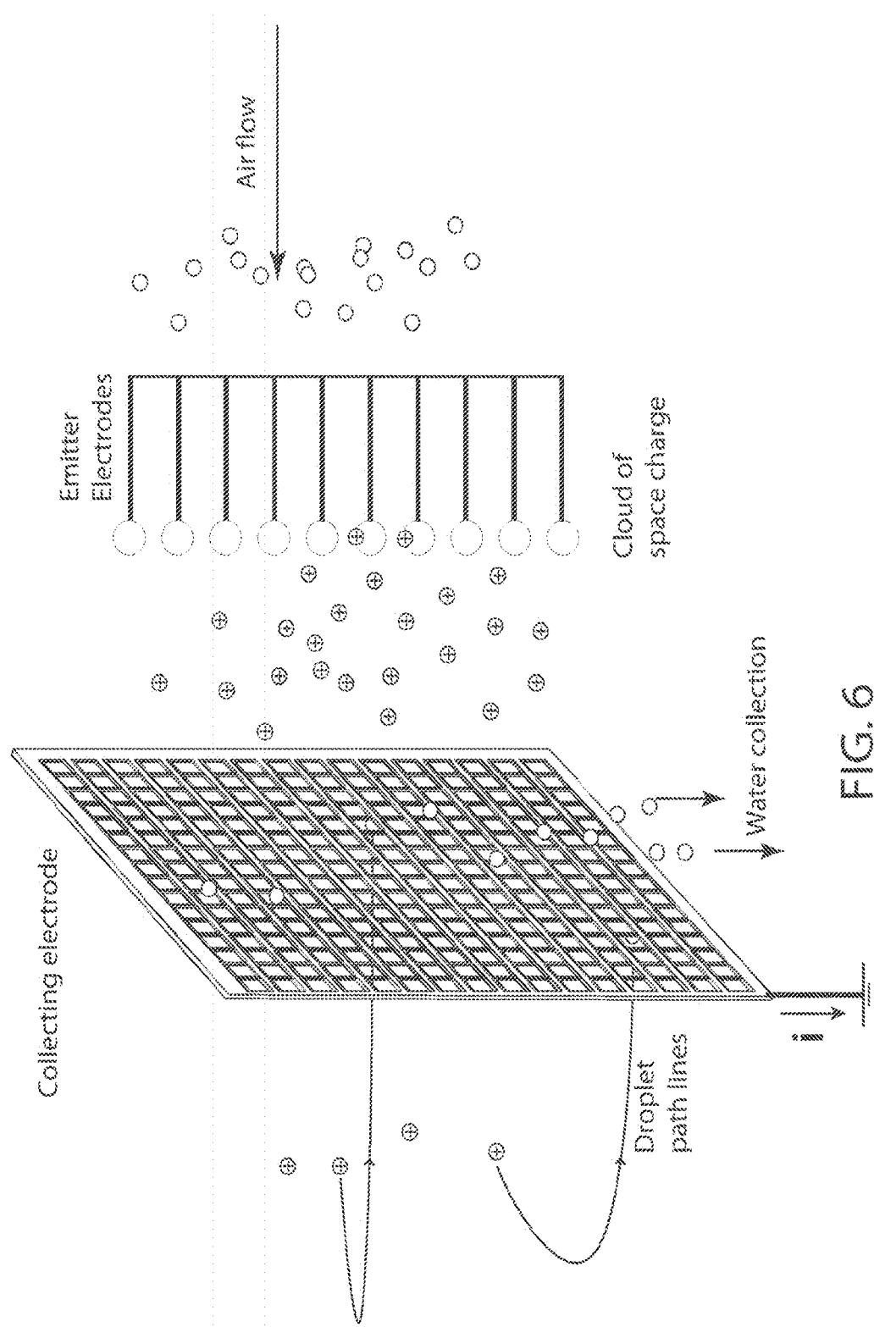
FIG. 6 shows a schematic depiction of an emitter electrode and a collector, according to some embodiments.

One approach is schematically shown in FIG. 5B. Particles are initially electrically neutral, and dielectrophoresis forces are not sufficient to affect their trajectories. Therefore, a corona discharge is used to inject a net charge into the droplets and then the droplets are directed towards the collector using an electric field. The application of a high voltage at the emitter electrode produces an electric field, whose lines go from the emitter to the grounded collector. This electric field does not affect the air streamlines, but acts only on the charged fog droplets. The case with a high voltage is shown in FIG. 5B, where the electric forces are much larger than the air drag forces, which makes the fog droplets follow the field lines and end up on both sides of the collection wire. As can be seen in the photograph in FIG. 5B, showing particles' trajectories in the presence of a strong electric field, that particles are collected all over the wire and that some particles that were not initially directed towards the wire are still captured. Intuitively, this suggests that the deposition efficiency, which was previously defined as the fraction of droplets directed towards the wire that are collected, can become higher than one.

Another phenomenon that often occurs with this system, when a mesh is used, is termed the "turn-around". When the droplets are charged with corona discharge, they are attracted to the collector surface. However, not all of them are captured. Due to the inertia of the wind, the electrostatic force may not be sufficient to modify the trajectory of some droplets and make them go to the mesh wires. These droplets pass through the openings and start to move away from the mesh. However, these droplets are still charged and they are still attracted to the grounded mesh. Due to this attraction, part of the droplets may turn and go back to be captured by the back surface of the mesh. This turn-around phenomenon contributes significantly to enhancing the collection efficiency since it allows doubling the used surface by using the back surface of the mesh as well, and it offers a second chance to catch the droplets that were let go when they arrived at the mesh. This leads to deposition efficiencies that are often higher than 100%: Droplets can be collected from an area larger than the projected area (surface area) of the collector, which represents the 100% efficiency case in traditional collectors (this is never reached: actual efficiencies are much lower in traditional collectors).

As showed herein, experimentally and theoretically, the deposition efficiency of such a system varies linearly with one non-dimensional number Ke, the electrical number.

$$Ke = \frac{2R_p\epsilon_0 V^2}{\eta_g d R_c\left(U_0 + \frac{2R_p}{\eta_g}\epsilon_0\frac{V^2}{d^2}\right)}$$

$R_p$ is the radius of the fog particles
$\epsilon_0$ is the permittivity of free space
V is the voltage difference between the emitter and the electrode
$\eta_g$ is the viscosity of the air
d is the distance between the emitter and the collector
$R_c$ is the radius of the mesh wires
$U_0$ is the wind speed This dependence allows predicting the voltage that should be applied to have a certain efficiency and can be adjusted in practice to compensate the effects of changes in wind speed for example.

In addition, by analyzing the phase diagram of this system, the optimal region of operation was identified, which can be described by 2 parameters:

First, the relative added velocity U*, which represents the ratio of the added velocity of the particles due to the acceleration by the electric field and the wind velocity.

$$U^* = \frac{2R_p\epsilon_0 V^2}{U_0\eta_g d^2}$$

Optimal operation is for U*<1. For U*>1 the system reaches voltage saturation. This limitation in the reachable collection rates essentially comes from the fact that, as the voltage is increased, there is a higher electric force attracting the particles, but the particles are also moving faster, which leaves less time for the electric force to attract them.

Another important parameter is the spacing D between the mesh wires, which is captured by the non-dimensional number D*.

$$D^* = \frac{D + 2R_c}{2R_c}$$

When the distance between the wires is too small, all the droplets between them are collected and increasing the voltage would be ineffective, since there is no more fog to collect.

When using corona discharge to collect fog, one should aim for efficiencies just below D*, while making sure that U*<1.

Discharge Electrode Before a Collecting Mesh

In this embodiment, a high voltage needle is placed before a mesh (FIG. 6). Fog-laden wind arrives at the vicinity of the needle where corona discharge is occurring. Charged ions attach to fog droplets and the droplets are directed to the collector. Most collected droplets are captured on the front side of the mesh. However if droplets pass through the mesh, they are still subject to the electric field caused by their image charge and to the turn-around effect. Therefore part of these drops can still be collected on the backside of the mesh.

Discharge Electrode after a Collecting Mesh

In this embodiment (FIG. 7), the high voltage needle is placed after the mesh. Fog droplets arrive at the mesh without having been subject to any charging. They are collected at the same rate as they would have been without electric field. The part that is not collected and that goes through the openings of the mesh then encounters the discharges electrode. Droplets are charged and there is an electric field that is caused by the potential difference between the needle and the collector and that is much higher than the image charge field and that drives the droplets to the collector. When the electric field is sufficiently high, this force overcomes the inertia of the droplets. Droplets change direction and go back to the mesh where they are collected on the backside. The turn-around phenomenon is more important here than in the previous embodiment, and, since significant collection occurs on both sides of the mesh, the effective collection surface is doubled compared to a traditional system.

Vertical Parallel Wires as a Collector

In this embodiment (FIG. 8) the horizontal wires of the collection mesh are eliminated. The previous analysis remains valid with only vertical wires with the same spacing, and vertical wires should have the same efficiencies as meshes. This embodiment reduces by half the cost of materials needed. Moreover, it promotes faster shedding of droplets. When droplets are large enough to start shedding by gravity, horizontal wires may act as pinning sites and hold the droplets at the joints between horizontal and vertical wires, effectively slowing down the shedding. Faster shedding with vertical wires implies that the wires may quickly be dry again and ready to collect new droplets. This may increase the collection rate.

Collection Rate with and without Field

Figure 9:
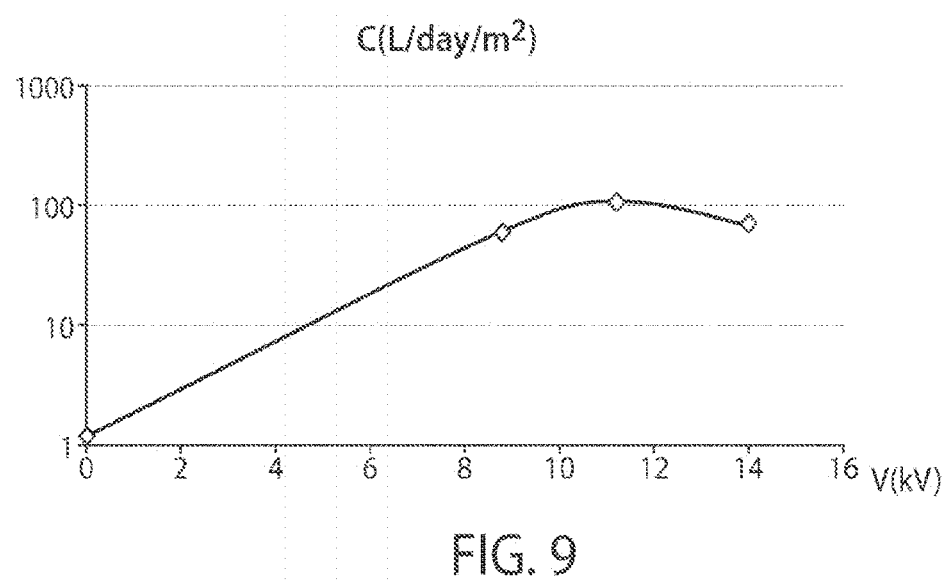
FIG. 9 shows a plot of the rate of the collection of fog in $L/(day \cdot m^2)$ as a function of the applied voltage in kV, according to certain embodiments.

Collection rates were experimentally measured with and without corona discharge. The first embodiment, in which the discharge electrode is placed before a collecting mesh, has been used, and the mass of water collected after a certain amount of time has been measured. The collecting surfaces were placed at a distance of 3.5 cm from the discharge electrode. Two sets of experiments were performed, one with moving air (speed 0.8 m/s) and the other with stagnant fog. The results are shown in FIG. 9. In the case where the fog is moving, shown in FIG. 9 (log-scale), the collection rate of fog on a mesh (0.002" openings, 41% shade coefficient, stainless steel) was enhanced by two orders of magnitude, going from 1 liter per day per m$^2$ of mesh, similar to what is reported in current applications, to 107 L/day/m$^2$ for a discharge voltage of 11.2 kV.

Figure 10:
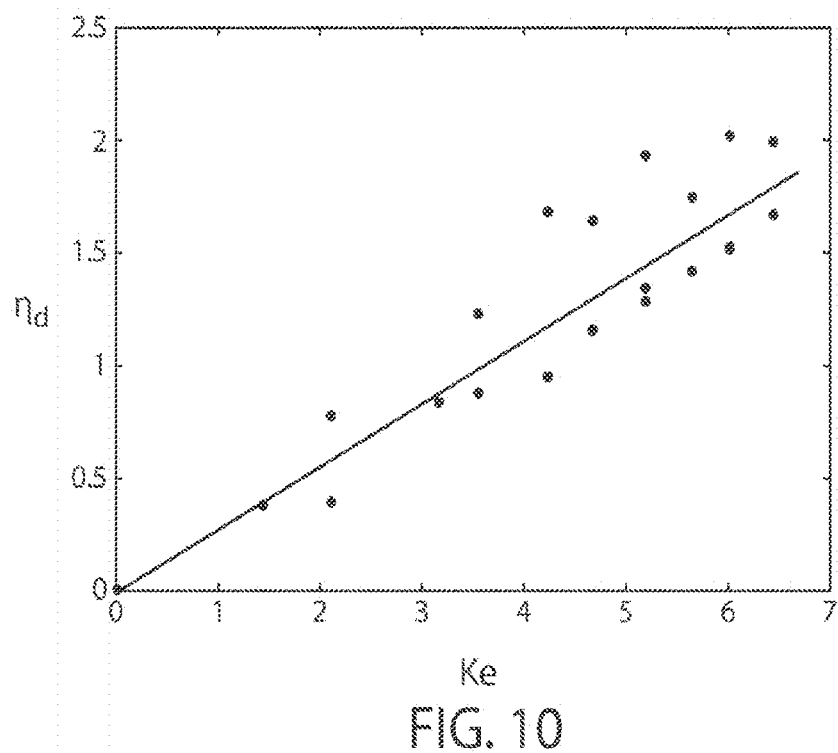
FIG. 10 shows the deposition efficiency as a function of Ke for selected meshes, in accordance with some embodiments.

FIG. 10 shows the deposition efficiency data as a function of the electrical number Ke (roughly proportional to V$^2$) for different meshes and different voltages. As can be seen in this figure, the efficiency increases linearly with Ke. This figure also shows that the deposition efficiency may be well above 100%, reaching values above 200% in some cases.

Figure 7:
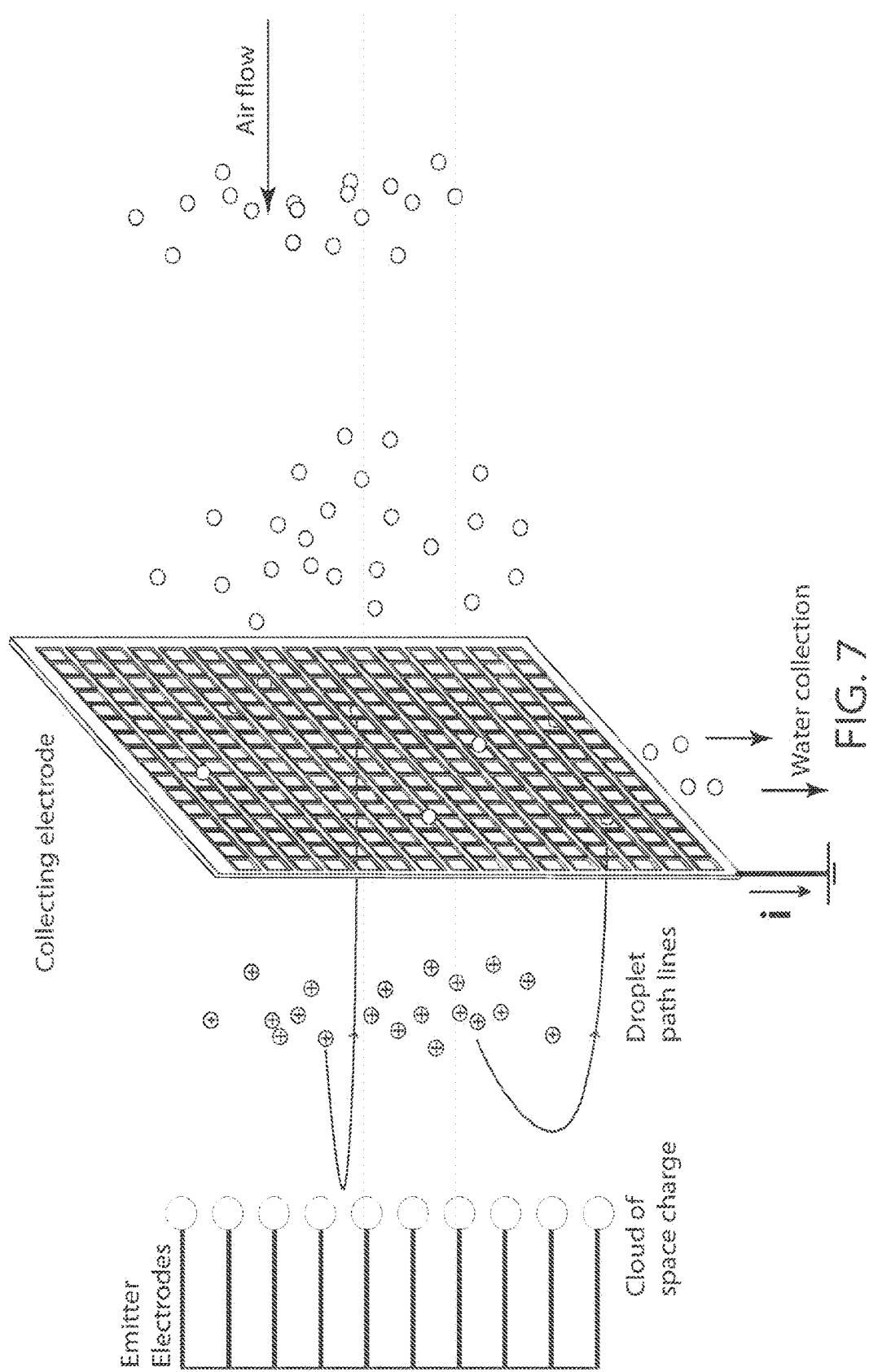
FIG. 7 shows a schematic depiction of an emitter electrode and a collector, according to certain embodiments.
Figure 8:
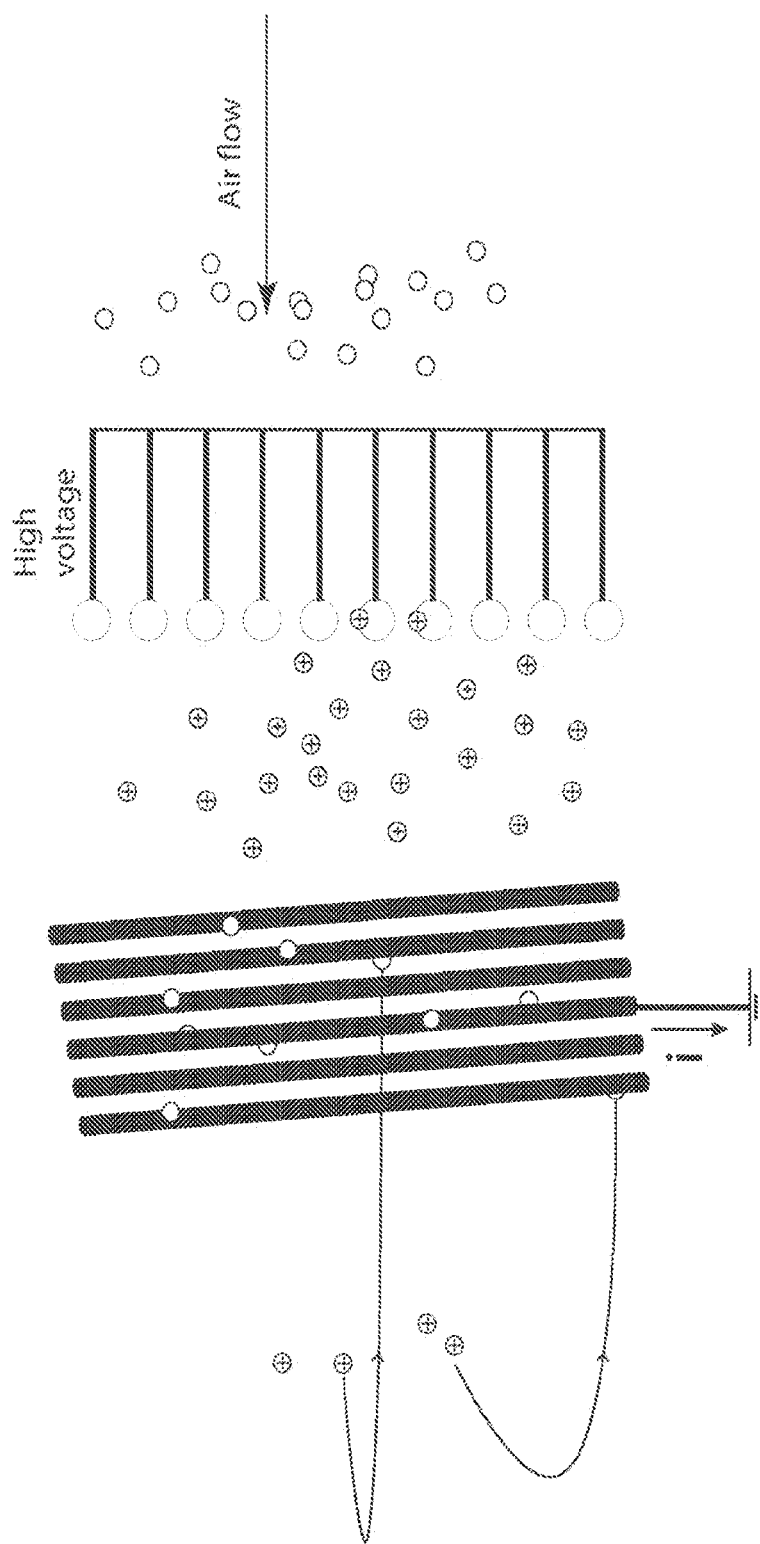
FIG. 8 shows, in accordance with some embodiments, a schematic depiction of an emitter electrode and a collector.
Figure 11A:
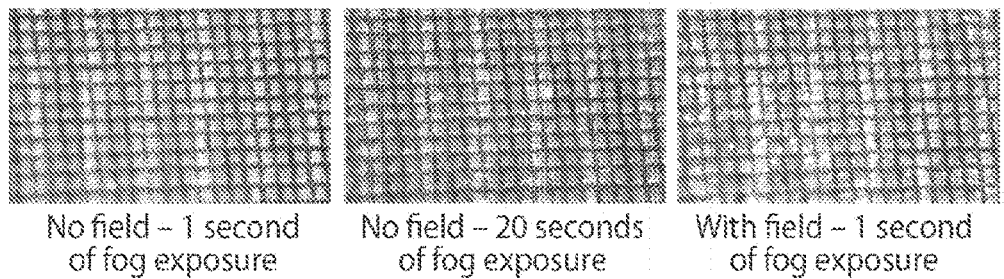
FIG. 11A shows, according to some embodiments, photographs of a mesh at different times with and without an applied electric field.
Figure 11B:
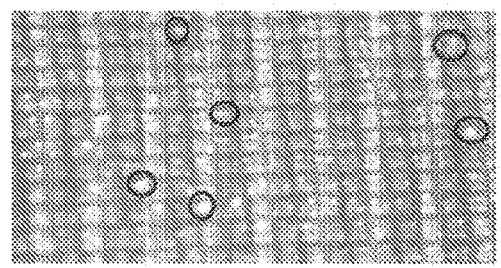
FIG. 11B shows, in accordance with some embodiments, a photograph of the back surface of a mesh showing droplets collected by turn-around.
Figure 11C:
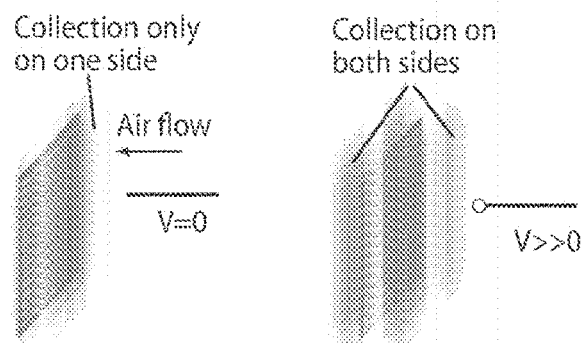
FIG. 11C shows, according to certain embodiments, a schematic illustration of the collection enhancement by doubling the effective collection area.

Visualization of the "Turn-Around Phenomenon" and Effect on the Rate of the Collection The enhancement in collection with corona discharge can also be visually observed directly. Snapshots of a collecting mesh at different times after exposure to fog, with and without electric field, are shown in FIGS. 11A-C. It can be observed that, as soon as the electric field is turned on, the number of collected droplets on the mesh increases dramatically. There are much more droplets on the mesh after one second of exposure with corona discharge than after 20 seconds without discharge. In FIB. 11B, the turn-around can be observed in some spots where there are droplets that are collected on the backside of the mesh. This enhances the collection rate since the area available for collection is doubled with the turn-around, as schematically shown in FIG. 7C.

Collection on a Single Cylindrical Wire

Figure 12A:
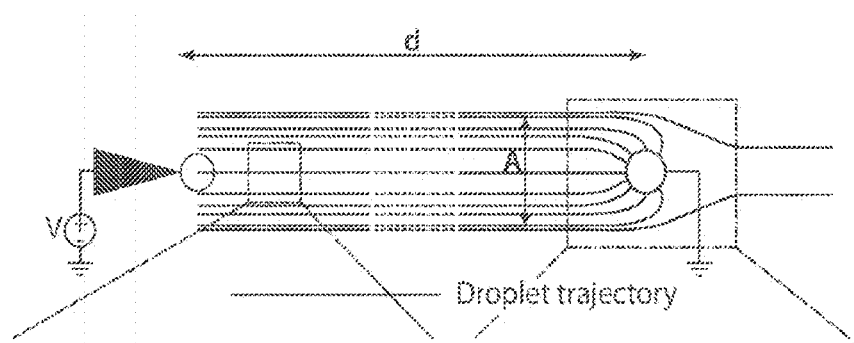
FIG. 12A shows, in accordance with some embodiments, a schematic illustration of a simplified experimental setup and droplet trajectories.

The typical setup that is used in this study is shown in FIG. 12A. A sharp electrode with a high curvature is placed at a distance d from the collector, a horizontal cylindrical wire of radius $R_c$. d is much larger than $R_c$, which is much larger than the radius of the fog particles $R_p$. The collector is electrically grounded (V=0), while a high voltage V is applied to the discharge electrode. When V is above a critical value, corona discharge occurs and the air is ionized. Corona discharge occurs when the electric field around the electrode is high enough to form a plasma region: Electrons in the air are accelerated and have enough energy to ionize the air atoms when they collide with them. A chain reaction starts with every collision creating additional electrons and ions. After a collision, electrons and ions are pulled in opposite directions by the electric field, preventing recombination. At a certain distance from the electrode, the electric field can no more give enough energy to the electrons to sustain the reaction. In this region, escaped ions travel freely in the air towards the opposite electrode and potentially attach to the fog particles they collide with. The particles then acquire a net charge q of the same sign as V.

As d is much larger than $R_c$, apart from small regions around the emitter and the collector, the electric field lines are essentially parallel and horizontal in the central region. It is assumed in all the following that the electric field is not disrupted by the presence of the fog, and inter-particle interactions are neglected. The magnitude of the electric field can then be estimated as v/d.

Figure 12B:
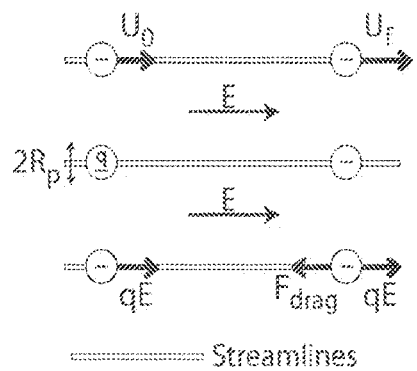
FIG. 12B shows an exemplary schematic of the acceleration of species in an electric field.

In the central region, fog particles undergo an acceleration phase, whose mechanisms are presented in FIG. 12B. The particles enter the region with the same velocity $U_0$ as the wind carrying them. Therefore, no drag force is exerted on them. However, since they acquired a net charge from the corona discharge and are in an electric field, an electric force acts on them. The particles are accelerated and their velocity becomes higher than $U_0$, giving rise to a drag force. When the drag force becomes equal to the electric force, the terminal velocity $U_f$ is reached and the particle is not accelerated anymore.

The force balance in this phase can be written as $$m\frac{d\vec{u}}{dt} = 6\pi\eta_g R_p(\vec{w} - \vec{u}) + q\vec{E}$$

Where $\vec{u}$ is the particle's velocity, $\eta_g$ is the air viscosity and $\vec{w}$ is the air velocity.

To determine whether the particle will reach its terminal velocity during the acceleration phase, the particle acceleration time scale is computed, which is given by $$\tau_{particle} = \frac{m}{6\pi\eta_g R_p} = \frac{2}{9}R_p^2\frac{\rho_w}{\eta_g}$$

In this case, $\tau_{particle}$ is one to two orders of magnitude smaller than the particle travel time from the emitter to the collector. Thus, the particles should reach their terminal velocity, which is given by a balance between drag and electric forces.

$$6\pi\eta_g R_p(U_f - U_0) = qE$$

$$U_f = U_0 + \frac{qE}{6\pi\eta_g R_p}$$

Without wishing to be bound by theory, in the case of a weak electric force, the terminal velocity will be close to the initial velocity, whereas in the case of a high electric force, the terminal velocity will be independent of the initial velocity and directly proportional to the electric force.

Figure 12C:
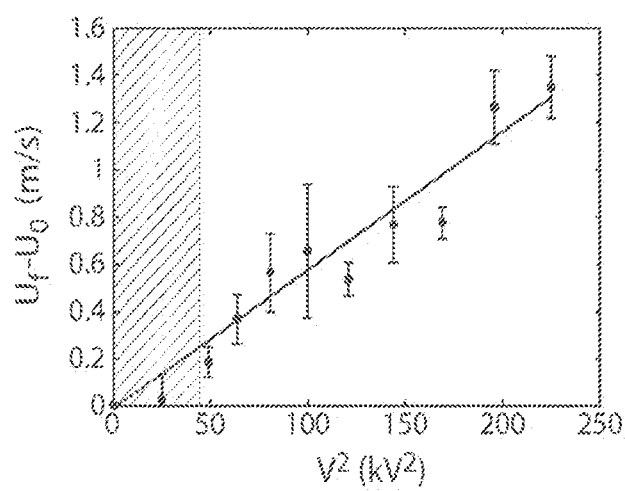
FIG. 12C shows, according to certain embodiments, a plot of the added velocity as a function of $V^2$.
Figure 12D:
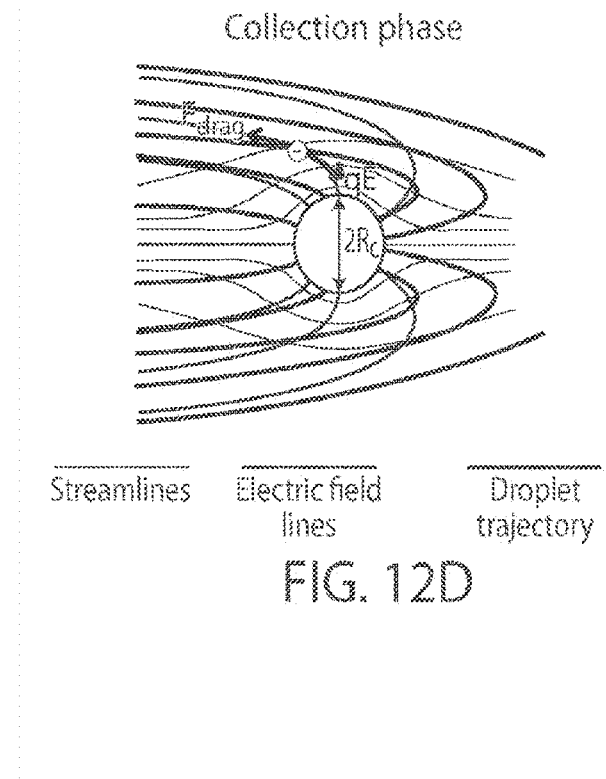
FIG. 12D shows a schematic of the collection of charged species, according to certain embodiments.

FIG. 12C shows experimental measures of the added velocity $U_f$–$U_0$ as a function of V$^2$. The shaded region of the graph corresponds to the case $V<V_{corona}$ where no charge injection occurs. The only electric force occurring there is dielectrophoresis, whose magnitude can be approximated by $$\frac{2\pi R_p^3 \epsilon_0 V^2}{d^3}.$$

In this case, this force is around 6 orders of magnitude smaller than the typical drag forces. As such, there is no added velocity before the onset of corona discharge. In the second region of the graph, charging occurs and the added velocity is generally proportional to $V^2$. The explanation of this proportionality may be that the electric field is proportional to V, and the charge on the particles is also proportional to V, which makes the electric force qE grow as $V^2$.

To estimate the particle charge and the electric force, the continuity equation for electric fields is used. Water is a conductor compared to air, the surrounding medium. The charge is localized at the surface of the fog particles and the surface charge per unit area can be estimated as $\sigma = \epsilon_0 E$.

Droplets can gain charge when the ions attach to them but they cannot lose charge to the air (insulator), so the final charge of a droplet can be determined by the maximum value of the electric field it encounters in its trajectory. The surface charge can then be estimated as $$\sigma = \epsilon_0 \frac{V}{d}.$$

More precise calculations give $$\sigma = 3\epsilon_0 \frac{V}{d}.$$

Thus $$q = 12\pi R_p^2 \epsilon_0 \frac{V}{d}$$

the electric force in the central region is $$F_{elec} = 12\pi R_p^2 \epsilon_0 \frac{V^2}{d^2}$$

and the added velocity is $$U_f - U_0 = \frac{2R_p}{\eta_g} \epsilon_0 \frac{V^2}{d^2}$$

The linear interpolation in FIG. 12C has a slope of 0.006. Using the above formula, $U_f-U_0=0.008\ V^2$, which matches well the experimental values, considering the uncertainties in measuring the parameters.

Here, $$U^* = \frac{2R_p \epsilon_0 V^2}{U_0 \eta_g d^2},$$

a nondimensional number expressing the ratio between the added velocity due to the electric field and the wind velocity.

After the acceleration phase, the fog droplets eventually approach the collector wire region, whose size is of the order of $R_c$. In this region, as shown in FIG. 12D, both the streamlines and the electric field lines start deviating from the parallel horizontal configuration. While streamlines go around the cylinder, field lines bend towards this conductive collector and end up perpendicularly to it. The electric field magnitude scales here as $$E \sim \frac{V}{R_c}.$$

In this region, the particles are still subject to drag and electric forces. As the distance to the cylinder increases, the electric field is weaker, while particles require a higher force to be collected since they are farther. Therefore, there may be a distance above which particles will not be collected, for a certain intensity of the applied voltage. The area of collection A is then defined as the projected area (surface area) of the flow of incoming particles that are collected on the cylinder. It is assumed that the cylinder has an infinite depth and in the calculations are performed in two dimensions. Thus, the area A will have the dimension of a length. Given the definition of the deposition efficiency, it is exactly $$\eta_d = \frac{A}{A_0},$$

where $A_0$ is the projected area (surface area) of the cylinder, equal to $2R_c$.

The area of collection for different voltages and wind speeds were experimentally measured, by imaging the region around the cylinder. FIG. 12E presents the nondimensional area $A/A_0$ as a function of $V^2$, for different values of $U_0$. It is observed that, for relatively low voltages or high wind speeds (region II of the plot in FIG. 12E), $A/A_0$ increases with $V^2$, which can be explained again by the fact that the driving electric force scales as $V^2$. It is also noticed that $A/A_0$ decreases with the wind speed, and actually scales as $1/U_0$, again for relatively low voltages or high wind speeds. This can be justified by the fact that, when $U_0$ increases, the electric force has less time to attract the droplets as they pass by the collecting cylinder. Finally, it is seen that, for low wind speeds and high voltages (region IV in FIG. 12E), $A/A_0$ starts to plateau, which means that, after a certain point, increasing the voltage does not help anymore collecting more droplets. Region III of the graph is the transition from the linear behavior to the plateau.

FIG. 16A shows the nondimensional collection area as a function of the inverse of wind speed for five different voltages. FIG. 16B shows the nondimensional collection area for two wires as a function of Ke for three different wire distances (closed shapes represent $A_{in}$ and open shapes represent $A_{out}$). $A_{out}$ generally has a linear behavior with a slope close to that of a single wire.

To rationalize these observations, the equation of movement, around the cylinder is written once more.

$$m\frac{d\vec{u}}{dt} = \frac{6\pi\eta_g R_p}{C_c}(\vec{w} - \vec{u}) + q\vec{E}$$

The equation is non-dimensionalized by dividing all distances by $R_c$, and velocities by $U_f$ $$\bar{r} = \frac{r}{R_c},\ \bar{\vec{u}} = \frac{\vec{u}}{U_f},\ \bar{t} = \frac{tU_f}{R_c}$$

-continued $$\frac{d\vec{u}}{d\bar{t}} = \frac{1}{St}(\vec{w} - \vec{u}) + \frac{Ke}{St}\frac{\vec{E}}{|\vec{E}|}$$

$$St = \frac{2R_p^2 \rho_w U_f}{9\eta_g R_c};$$

$$Ke = \frac{qE}{6\pi\eta_g R_p U_f}$$

Ke is the ratio of electric and viscous forces, and it is called the electrical number herein. Apart from these non-dimensional numbers, all the terms of the equation are of order 1. Around the cylinder E scales as $V/R_c$ and the expressions of q and $U_f$ that were obtained previously can be used.

$$St = \frac{2R_p^2 \rho_w \left(U_0 + \frac{2R_p}{\eta_g}\epsilon_0 \frac{V^2}{d^2}\right)}{9\eta_g R_c},$$

$$Ke = \frac{2R_p \epsilon_0 V^2}{\eta_g dR_c \left(U_0 + \frac{2R_p}{\eta_g}\epsilon_0 \frac{V^2}{d^2}\right)}$$

Moreover, in the low Stokes limit, corresponding to relatively large wires, the equation is further simplified into $$0 = (\vec{w} - \vec{u}) + Ke\frac{\vec{E}}{|\vec{E}|}$$

The electrical number should then govern the physics of the problem, in particular the nondimensional collection area:

$$\frac{A}{A_0} = f(Ke)$$

Figure 13:
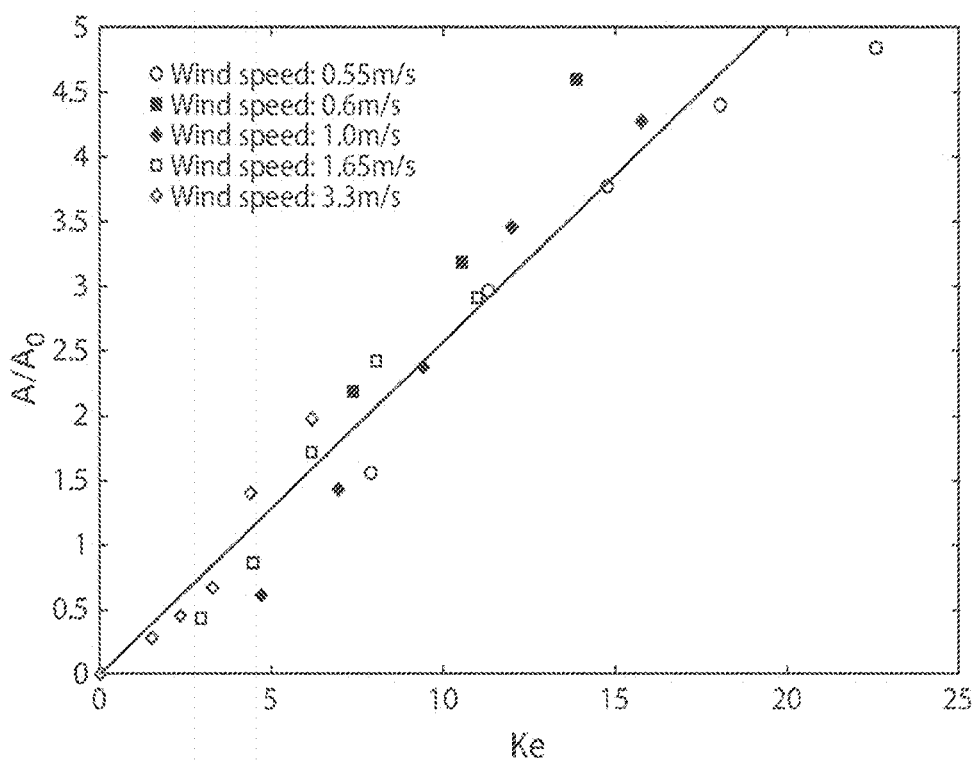
FIG. 13 shows the dependence of the nondimensional collection area on the electrical number, according to one set of embodiments.

In FIG. 13, $A/A_0$ is plotted as a function of Ke, and it is seen that the previous data of different voltages and wind speeds collapses into one linear master curve. This linear behavior is expected, as Ke represents the relative amplitude of the driving force causing the collection. The proportionality constant, is determined experimentally (0.26 here) and allows predicting the efficiency of such a system for any values of the problem parameters.

Figure 12E:
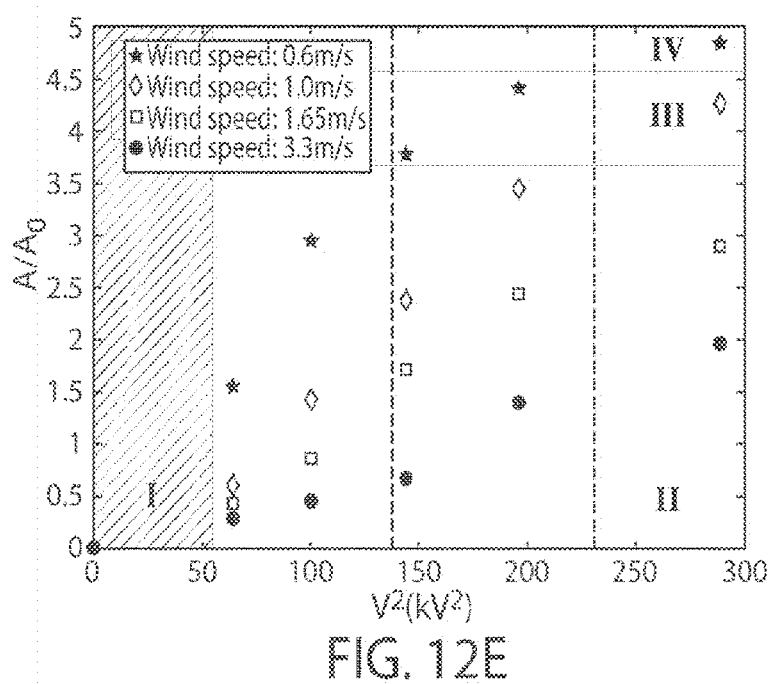
FIG. 12E shows a plot of the nondimensional collection area as a function of $V^2$ for different wind speeds, according to certain embodiments.

This dependence on Ke explains the behaviors observed earlier. For low U* (low voltages or high wind speeds), the term containing $V^2$ in the denominator is negligible and Ke scales as $V^2$. That is why the non-dimensional area increases linearly with $V^2$ in this regime (region II of FIG. 12E). However, for high U*, $U_0$ becomes negligible in the denominator and Ke tends towards a constant $$\left(\frac{d}{R_c}\right),$$

which is the plateau region. This can be called the voltage saturation. This limitation in the reachable collection rates essentially comes from the fact that, as the voltage is increased, there is a higher electric force attracting the particles, but the particles are also moving faster, which leaves less time for the electric force to attract them. Eventually, at high voltages, these two effects balance each other, and the collection cannot be enhanced anymore. The vertical dotted lines in FIG. 12E represent U*=0.5 for the two lowest wind speeds. This value gives an approximation of when the initial velocity starts to be overcome by the added electrical velocity, or, equivalently, when the transition towards the voltage saturation starts.

It is expected that a similar behavior to hold for different geometries, such as meshes that are ultimately the geometries of interest here, with only the proportionality constant changing with the geometry.

Collection on Two Parallel Cylindrical Wires

Figure 14A:
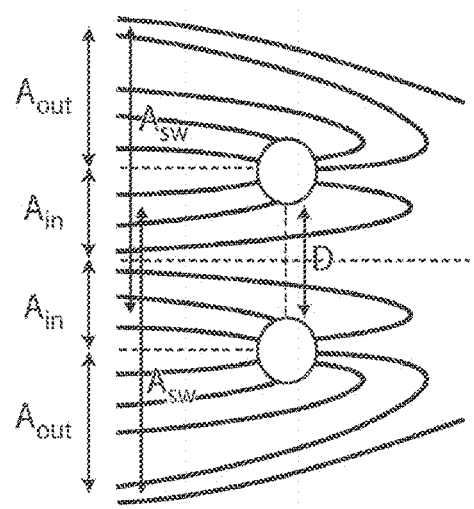
FIG. 14A shows a schematic illustration of droplet trajectories in a two-wire system, in accordance with some embodiments.

To extend the model developed as described above for single cylindrical wires, fog collection on a system of two parallel cylindrical wires is investigated. It is hypothesized that, when the wires are far from each other, they behave as two single wires. However, when they are close enough, they may start competing over the same droplets between them, thereby limiting the collection, as shown schematically in FIG. 14A. The distance D between the wires is thus incorporated into the model through the nondimensional number $$D^* = \frac{D + 2R_c}{2R_c}.$$

Two areas of collection, $A_{in}$ and $A_{out}$, are also defined, accounting for the projected area (surface area) of the flow of the collected incoming particles, respectively in the inner and outer parts of the system.

Figure 14B:
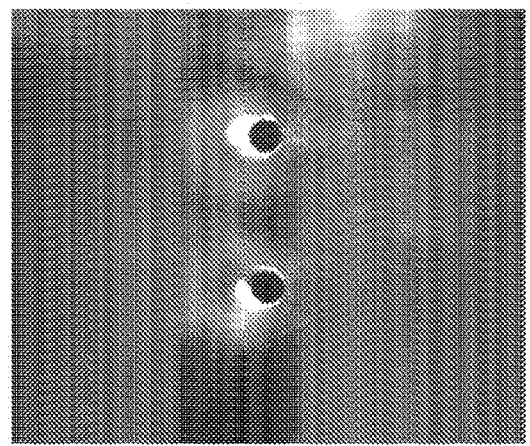
FIG. 14B shows a photograph of species trajectories, in accordance with certain embodiments.

FIG. 14B is a photograph showing the two cylinders and the droplets trajectories, in a case where D is small enough so that most of the droplets between the wires are collected. When this happens (small D), a simple geometrical analysis shows that $A_{in}$ reaches a saturation value that is equal to $$R_c + \frac{D}{2},$$

or in nondimensional terms $$\frac{A_{in}}{A_o} = D^*,$$

where $A_0$ here is equal to $R_c$ since only one half of the cylinder is being considered. This limitation is termed the spacing saturation.

It was hypothesized that $$\frac{A_{in}}{A_o} \text{ and } \frac{A_{out}}{A_o}$$

grow with the single wire law until the spacing saturation is reached, at which point $A_{in}$ will plateau, while $A_{out}$ will still follow the single wire law. Knowing that the saturation happens when $$\frac{A_{in}}{A_o} = D^*,$$

the single wire law $$\left(\frac{A_{in}}{A_o} = c.Ke,\right.$$

where c is the proportionality constant) can be used to predict the electrical number (or equivalently the voltage) at which spacing saturation starts $$Ke_{sat} = \frac{D^*}{c},$$

or, for a certain electrical number, to predict the critical distance $D^*_{sat}$ at which spacing saturation happens.

Figure 14C:
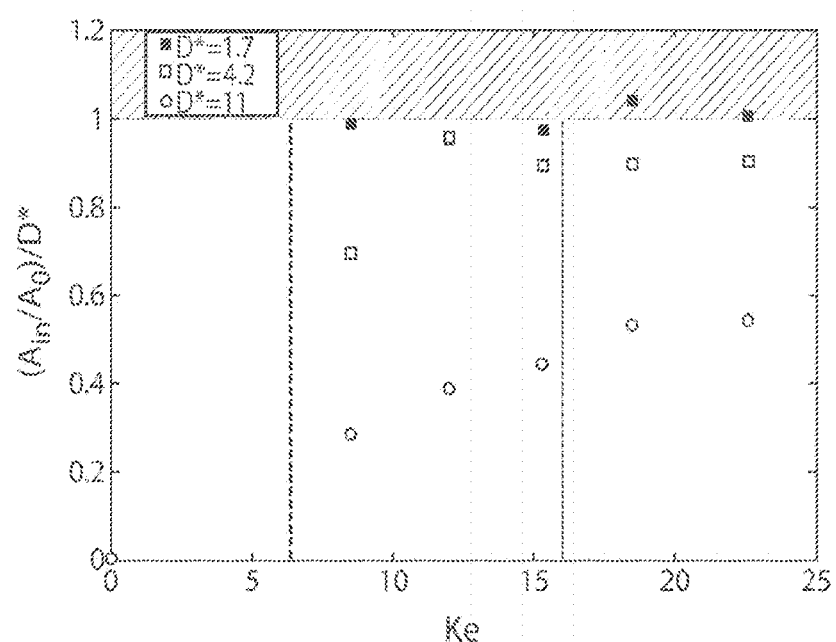
FIG. 14C shows, according to certain embodiments, a plot of $$\frac{A_{in}}{A_0}/D^*$$

$A_{in}$ and $A_{out}$ were experimentally measured for different Ke and $D^*$. The results for $A_{in}$ are reported in FIG. 14C. It is observed that $$\frac{A_{in}}{A_o}/D^*$$

increases with Ke and plateaus at 1 for low values of $D^*$. Before the plateau, $$\frac{A_{in}}{A_o}$$

increases linearly with ice, with a slope equal to what was measured in the single wire case. The shaded zone of the graph, representing $$\frac{A_{in}}{A_o} > D^*,$$

is inaccessible because of the competition over a finite number of droplets that leads to saturation. The vertical dotted lines represent the expected saturation Ke for the cases of $D^*=1.7$ and $D^*=4.2$ from the previous model and it can be seen that plateaus are observed beyond these lines for the corresponding curves.

For $D^*=11$, spacing saturation is not observed here and is expected to occur at a much higher Ke. However, such a high Ke cannot be reached because of the voltage saturation, which may be a limiting factor here, in some cases.

Collection on Meshes

Having rationalized the behavior of two parallel wires, the macroscopic collection on the ultimate system of interest: meshes, was studied. Similar experiments were conducted by placing a 5 cm×5 cm mesh perpendicularly to the fog-laden wind direction and a petri dish under the mesh, and measuring the mass of the collected water after a certain amount of time.

The difference in collection when corona discharge is applied is immediately visible to the naked eye. As shown in FIG. 15A, the mesh is covered with water within a few seconds when a high voltage is applied, while it is little wet after minutes of exposure to fog when there is no electric field.

Five different meshes were used. All had the same wire radius, but the spacing D between the wires was increased from Mesh 1 to Mesh 5. The shading coefficient SC, or the projected relative surface of the wires, was thus decreased.

FIG. 15B shows the mass of collected water after five minutes of exposure, for different electrical numbers Ke. The mass m increases linearly with Ke for the five meshes, although the proportionality constant varies from mesh to mesh. It is noticed that the mesh with the highest collection is not the one with the highest wire density; Mesh 2 has fewer wires but still collects more water. Finally, meshes 1 and 2 start to plateau at high Ke, which is due to spacing saturation. The vertical dashed lines in FIG. 15B show the predicted spacing saturation limits from the two parallel wires model for the three first meshes, the last two being out of the scope of the graph. That model is not exactly valid here since the geometry is different, with parallel and perpendicular wires, but it can provide a good approximation of the onset of spacing saturation.

The efficiency η of the collection process as the ratio of the collected mass and the total mass of water directed towards the mesh is computed. As stated before, $\eta = \eta_a \eta_d \eta_{other}$.

$$\eta_d = \frac{A}{A_0}$$

is the efficiency that was focused on in the previous analysis. It was assumed that it is possible to neglect $\eta_{other}$, that its effect will be similar on all the meshes. The aerodynamic efficiency has been previously studied and it is given by $$\eta_a = \frac{SC}{1 + \left[1.22\left(1.3SC + \left(\frac{SC}{1-SC}\right)^2\right)\right]},$$

where SC is the shading coefficient.

The deposition efficiency $$\eta_d = \frac{1}{\eta_a} \frac{m_{collected}}{m_{total}}$$

can then be calculated. Its values are plotted in FIG. 15C as a function of Ke, and it can be seen that the data collapses around a linear curve, which shows that the models for single and double wires holds for meshes.

The proportionality constant is different from the single wire case because of the different geometry, but also because of the effects of the other inefficiencies that were neglected here, since what is really being plotted is $\eta_d \cdot \eta_{other}$. These other inefficiencies may also explain the relatively higher dispersion of the results around the linear curve, as compared to the single wire case.

$\eta_d \cdot \eta_{other}$ reaches values over 2, which means that $\eta_d$ is much higher than one. Therefore, these high values of $\eta_d$ can compensate other inefficiencies, and lead to very high overall efficiencies for the collection system.

When designing such an active collection mesh, the geometry and operating voltage should be chosen so as to remain below the voltage saturation and the spacing saturation, to maximize the collection without spending any unnecessary energy.

CONCLUSION

It has been demonstrated that it is possible to dramatically enhance the efficiency of fog collection on meshes by breaking the traditional aerodynamic limitation, using corona discharge. Particles are accelerated and directed towards the collector, as electric forces overcome the hydrodynamic ones. It has been shown that the problem is governed by four non-dimensional numbers St, Ke, U* and D*. The deposition efficiency $\eta_d$ depends on the first two numbers and, in particular, it has been shown that, in the case of low St, $\eta_d$ is proportional to Ke. U* and D* predict two important limitations that are the voltage and spacing saturations. They should therefore serve as design parameters for active collection meshes, to operate just below the saturations, and fully optimize the water produced per energy spent. This method may be combined with others, such as surface treatment of the collector, to slightly enhance the efficiency. This experiment has been performed exclusively in the low Stokes regime, and, while the high Stokes regime may be the object of scientifically interesting future work, the low Stokes regime is much more interesting in practice, as minimizing the inertia force is advantageous here, and manufacturing meshes with large wires is easier than making finer ones. These results can be used to design efficient fog harvesters in drought-prone areas and collect water for drinking, irrigation and afforestation. Fog removal systems to increase visibility on roads and airports may also be designed.

Experimental Set-Up and Procedure

Samples were placed 4 cm away from the outlet, perpendicularly to the axis, of two concentric cylinders (6.3 cm, 5 cm inner diameters) from which a uniform stream of fog was coming. Fog consisted in a cloud of air-suspended water droplets of radius 3.5 µm, generated using an ultrasonic humidifier (Air-O-Swiss AOS 7146) delivering a volume rate of up to 0.1 L/hour. Fog was generated directly into the smaller cylinder through an orifice. At the inlet of the larger cylinder, a speed-tunable fan (Thermaltake Mobile Fan II External USB Cooling Fan) was placed to create the airflow that would convect the fog towards the collection area. A honeycomb flow straightener (Saxon Computers 120 mm Honeycomb Airflow Straightener) was placed after the fan to ensure that the wind velocity is uniform through the area of the cylinder, thus reproducing real-fog conditions. The outlet velocity was measured with an anemometer (Testo 405 Hot Wire Thermo-Anemometer) and was spatially uniform within a 15% interval. Corona discharge was produced by placing a sharp metallic needle inside the cylinders, its tip coinciding with the outlet of the smaller cylinder. The needle was connected to a high-voltage generator (Spellman SL600) delivering voltages from 0 to −25 kV. Corona discharge was observed to start at a voltage around −7.6 kV. In all experiments, the collector was connected to the ground, setting its voltage at 0V. All experiments were performed in ambient temperature and humidity conditions.

Wires and Meshes

In single and two-wire experiments, cylindrical needles, made of stainless steel, of length 4 cm, and of diameter 1.88 mm were used as collectors.

5 cm square meshes were used for collection tests. They were purchased from McMaster-Carr (Corrosion-Resistant Type 304 Stainless Steel Wire Cloth), and their individual characteristics are summarized in Table 1.

TABLE 1

Characteristics of meshes (collectors)

| Mesh | Wire diameter (in) | Opening size (in) | D* | Open area |
|---|---|---|---|---|
| Mesh 1 | 0.063 | 0.062 | 1.98 | 25% |
| Mesh 2 | 0.063 | 0.104 | 2.65 | 39% |
| Mesh 3 | 0.063 | 0.187 | 3.97 | 56% |
| Mesh 4 | 0.063 | 0.270 | 5.29 | 66% |
| Mesh 5 | 0.063 | 0.437 | 7.94 | 76% |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Any terms as used herein related to shape, orientation, alignment, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described. As another example, two or more fabricated articles that would described herein as being "aligned" would not require such articles to have faces or sides that are perfectly aligned (indeed, such an article can only exist as a mathematical abstraction), but rather, the arrangement of such articles should be interpreted as approximating "aligned," as defined mathematically, to an extent typically achievable and achieved for the recited fabrication technique as would be understood by those skilled in the art or as specifically described.

What is claimed is:

1. A method of collecting a fluid species present in a gas stream, comprising the steps of:
    establishing a plurality of charged fluid species in the gas stream using a first electrode, electrically biased against a second electrode, the second electrode comprising a collector;
    urging the plurality of charged fluid species towards the second electrode, wherein at least a portion of the plurality of charged fluid species passes through a front surface and a back surface of the collector;
    urging at least the portion of the plurality of charged fluid species towards the back surface of the collector after at least the portion of the plurality of charged fluid species passes through the front surface and the back surface of the collector; and
    collecting the charged species at the collector at a collection efficiency of greater than or equal to 10%.

2. A method of collecting a fluid species present in a gas stream, comprising the steps of:
    arranging, within the gas stream, a first electrode and a second electrode comprising a collector proximate the first electrode;

applying a potential to the first electrode such that at least a portion of the fluid species present in the gas stream deposits on a front surface and a back surface of the collector; and collecting the fluid species with a collection efficiency of greater than or equal to 10% wherein a minimum distance between the first electrode and the second electrode is between 2 cm and 50 cm.

3. A method of collecting a fluid species present in a gas stream, comprising the steps of:

arranging, within the gas stream, a first electrode and a second electrode comprising a collector proximate the first electrode;

applying a potential to the first electrode such that at least a portion the fluid species present in the gas stream deposits on a front surface and a back surface of the collector; and collecting the fluid species at an energy efficiency of greater than or equal to 1 liter per kWh of energy applied in applying the potential.

4. A collection system for collecting a fluid species, comprising:

a first electrode;

a collector comprising a mesh with a front surface and a back surface;

a second electrode comprising at least a portion of the collector configured to be positioned proximate the first electrode; and a power source in electrical communication with at least the first electrode, wherein the system is configured to collect the fluid species present within a gas stream on the front surface and the back surface of the mesh with an energy efficiency of greater than or equal to 1 liter per kWh of energy applied in creating a field with the second electrode.

5. The method as in claim 1, wherein the fluid species comprises water.

6. The method as in claim 2, wherein the second electrode comprises a mesh.

7. The method as in claim 2, wherein the second electrode comprises parallel wires.

8. The method as in claim 2, wherein the first electrode comprises needles.

9. The method as in claim 8, wherein an average radius of curvature of the needles is greater than or equal to 10 microns.

10. The method as in claim 2, wherein the second electrode is positioned downstream of the first electrode.

11. The method as in claim 2, wherein the second electrode is positioned upstream of the first electrode.

12. The method as in claim 2, wherein the first electrode is held at a negative potential.

13. The method as in claim 2, wherein the first electrode is held at a positive potential.

14. The method as in claim 2, wherein the second electrode is grounded.

15. The method as in claim 2, wherein the second electrode is held at a negative potential.

16. The method as in claim 2, wherein the second electrode is held at a positive potential.

17. The method as in claim 2, wherein water is collected on a surface of the second electrode facing the first electrode.

18. The method as in claim 2, wherein water is collected on a surface of the second electrode not facing the first electrode.

19. The method as in claim 2, wherein a difference in potential between the first electrode and the second electrode is greater than or equal to 2 kV and less than or equal to 100 kV.

20. The method as in claim 2, wherein applying the potential to the first electrode comprises ionizing at least a portion of the gas stream.

21. A method as in claim 20, comprising a further step of exposing the gas steam stream to ozone.

22. A method as in claim 2, comprising a further step applying the potential to the first electrode such that ozone is generated.

23. A method as in claim 2, wherein a corona discharge is generated by the first electrode.

24. A method as in claim 2, wherein the corona discharge purifies at least a portion of the fluid species.

25. A method as in claim 2, further comprising a third electrode.

26. The method of claim 25, wherein the third electrode is positioned downstream of the second electrode.

27. The method of claim 25, wherein the third electrode is capable of charging the fluid species.

28. The method as in claim 2, wherein the first electrode used to charge the fluid species does not contribute to an electric field used to collect the fluid species.

29. The method as in claim 2, wherein a grounded electrode is used to charge the fluid species.

30. The method as in claim 2, further comprising a method step of electrospraying a volatile liquid to generate space charge.

31. The method of claim 2, wherein the fluid species deposits will a deposition efficiency of greater than or equal to 100%.

32. The method of claim 2, wherein the fluid species comprises a droplet.

33. The method of claim 32, wherein the droplet comprises water.

* * * * *